United States Patent [19]

Sasaki

[11] Patent Number: 4,992,952
[45] Date of Patent: Feb. 12, 1991

[54] PAINT DISCHARGE RATE CONTROL SYSTEM

[75] Inventor: Hitoshi Sasaki, Higashihiroshima, Japan

[73] Assignee: Mazda Motor Corporation, Hiroshima, Japan

[21] Appl. No.: 247,069

[22] Filed: Sep. 20, 1988

[30] Foreign Application Priority Data

Sep. 21, 1987 [JP] Japan .................. 62-234925
Sep. 24, 1987 [JP] Japan .................. 62-237465
Sep. 24, 1987 [JP] Japan .................. 62-237466

[51] Int. Cl.$^5$ ............... B05B 12/14; G06F 15/46
[52] U.S. Cl. ................... 364/510; 118/696; 239/69
[58] Field of Search ............ 364/510, 468, 143; 118/696, 697, 677; 239/69, 407

[56] References Cited

U.S. PATENT DOCUMENTS

| | | | |
|---|---|---|---|
| 4,592,305 | 6/1986 | Scharfenberger | 118/677 |
| 4,593,360 | 6/1986 | Cocks | 364/510 |
| 4,614,300 | 9/1986 | Falcoff | 118/697 |
| 4,720,801 | 1/1988 | Boll | 364/510 |

FOREIGN PATENT DOCUMENTS 60-61076 4/1985 Japan .
60-61077 4/1985 Japan .

Primary Examiner—Thomas G. Black
Assistant Examiner—Ellis B. Ramirez
Attorney, Agent, or Firm—Wenderoth, Lind & Ponack

[57] ABSTRACT

A paint discharge rate control system includes a paint flow regulator provided in a paint supply line connecting a color changing valve group to a painting nozzle, a paint mass flow meter for measuring the mass flow rate of paint, provided in the paint supply line, and a control for controlling the paint flow regulator on the basis of a paint mass flow rate measured by the paint mass flow meter to control paint discharge rate. The control converts a measured paint mass flow rate measured by the paint mass flow meter into a volumetric flow rate, and controls the paint flow regulator during a push-out operation, in which the valves of the color hanging valve group are closed and a valve for supplying a washing liquid is opened, so that the paint remaining in the paint supply line is pushed out by the washing liquid at a paint discharge rate at which the paint is discharged during the main step of painting. The paint discharge rate control system is capable of controlling a painting machine so that paint is discharged always at an optimum paint discharge rate without requiring the setting of the density of a fluid, namely, paint or a washing liquid, that flows through the mass flow meter. Thus, the accuracy of controlling paint mass flow rate during the pushing out of the paint remaining in the paint supply line is improved, so that the paint remaining in the paint supply line is exhausted effectively to form a paint film having a uniform, appropriate thickness.

11 Claims, 19 Drawing Sheets

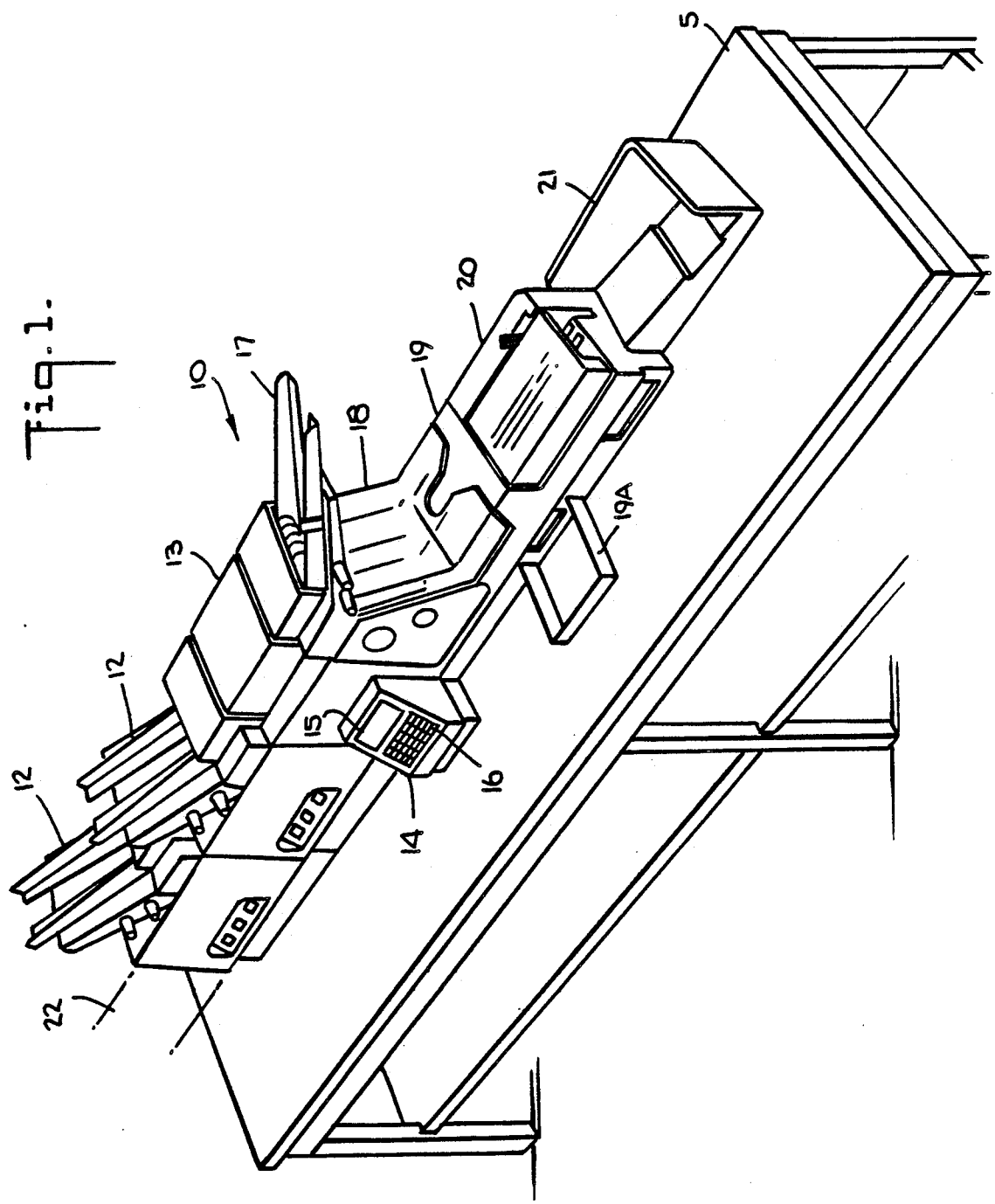

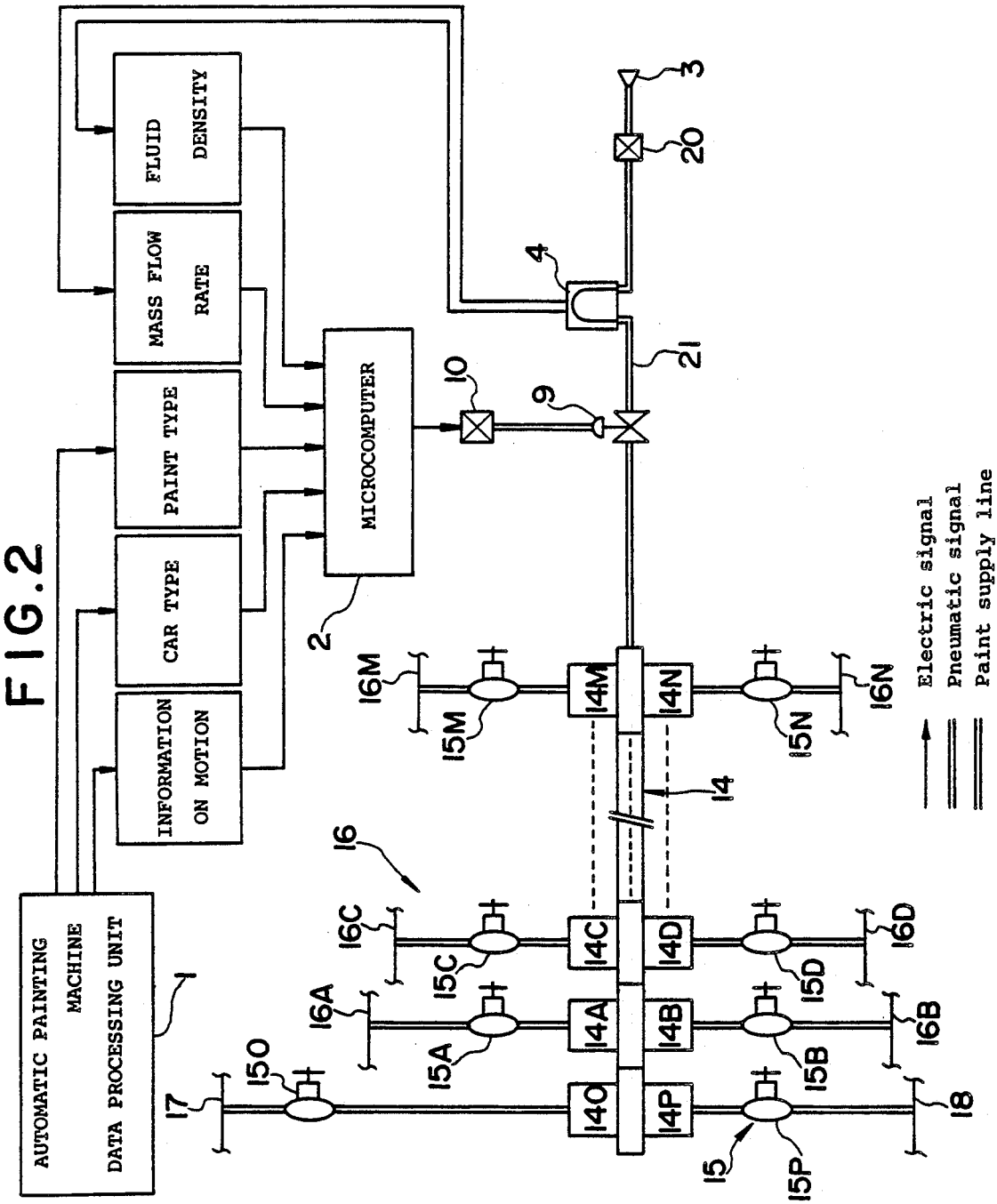

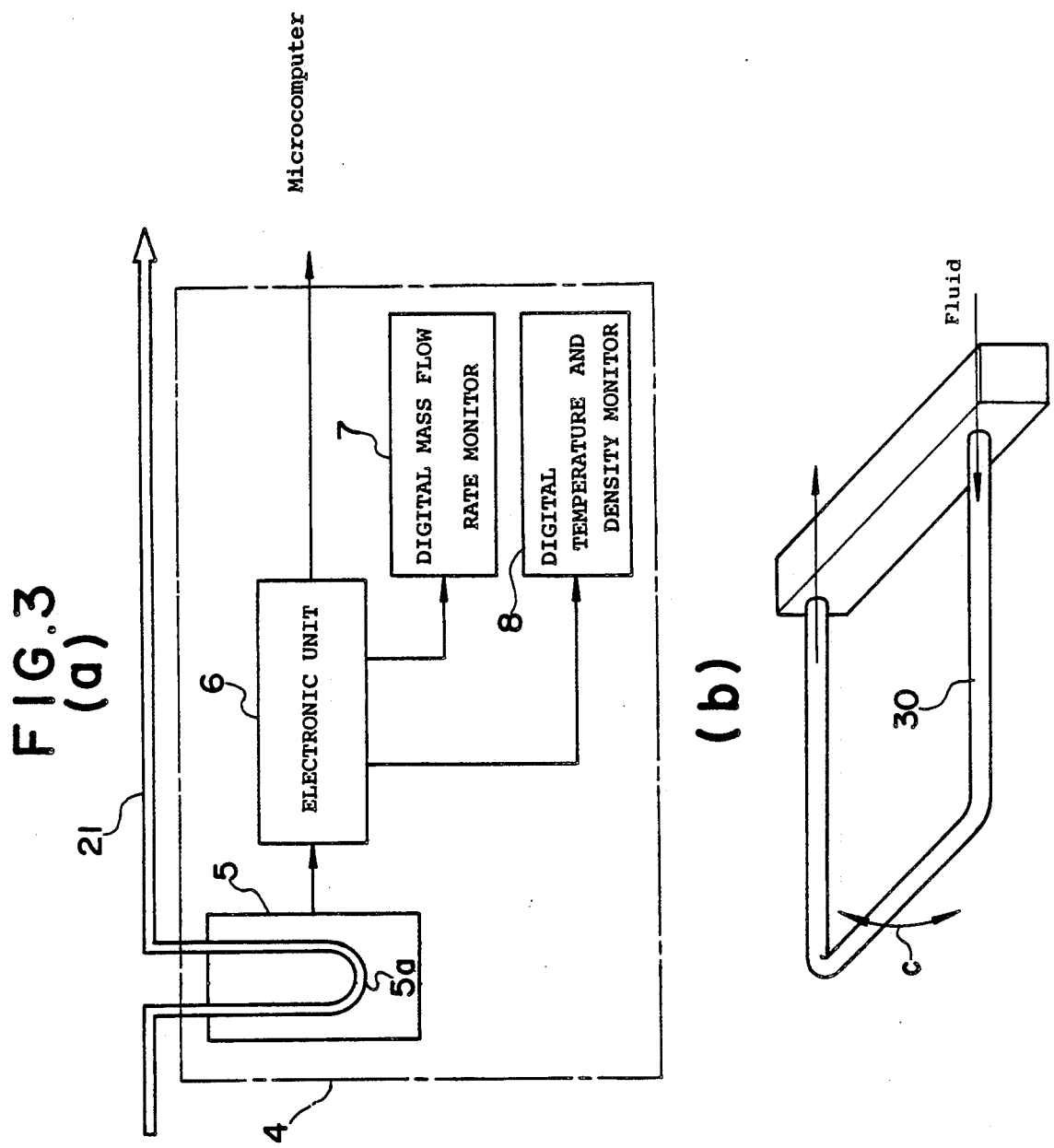

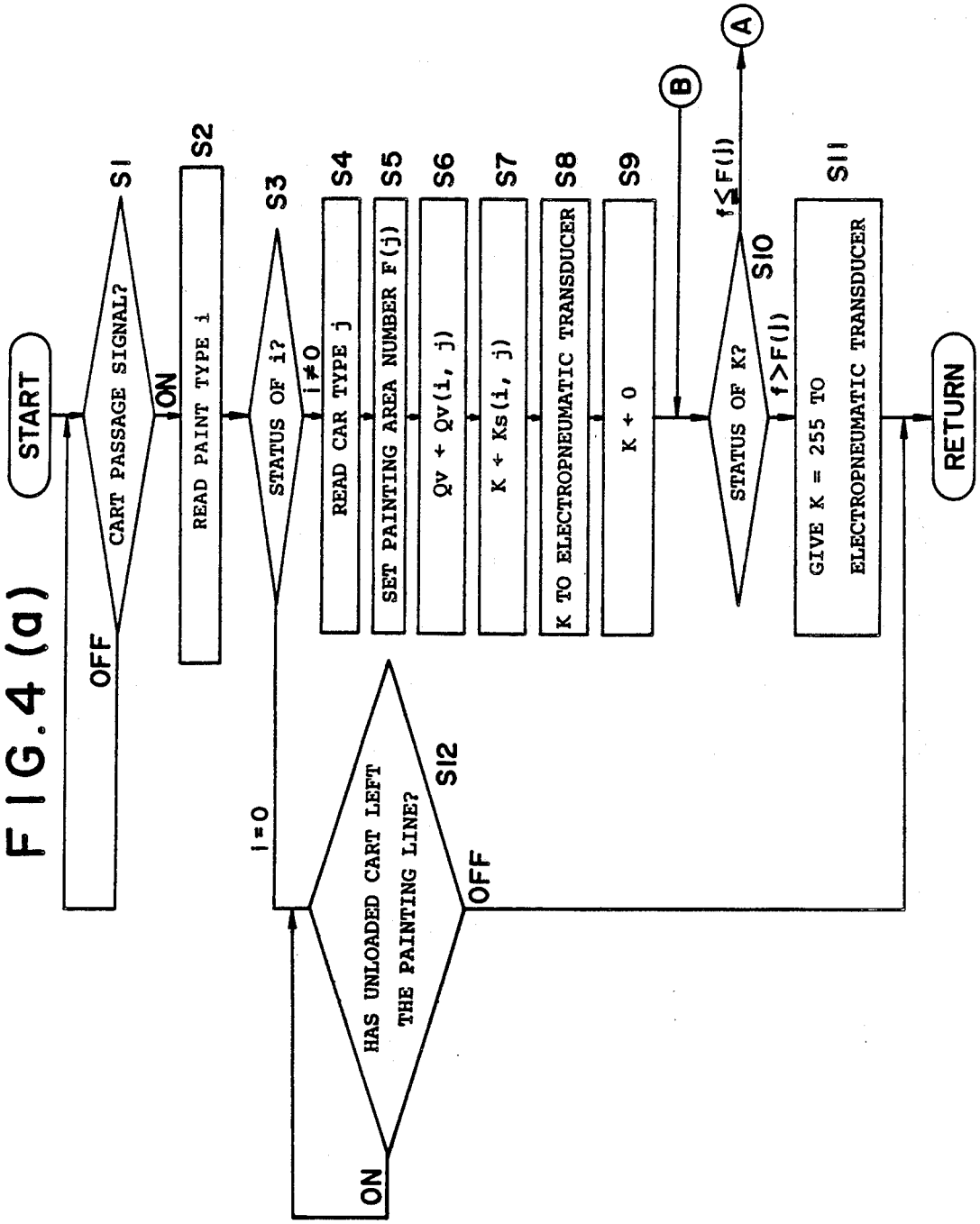

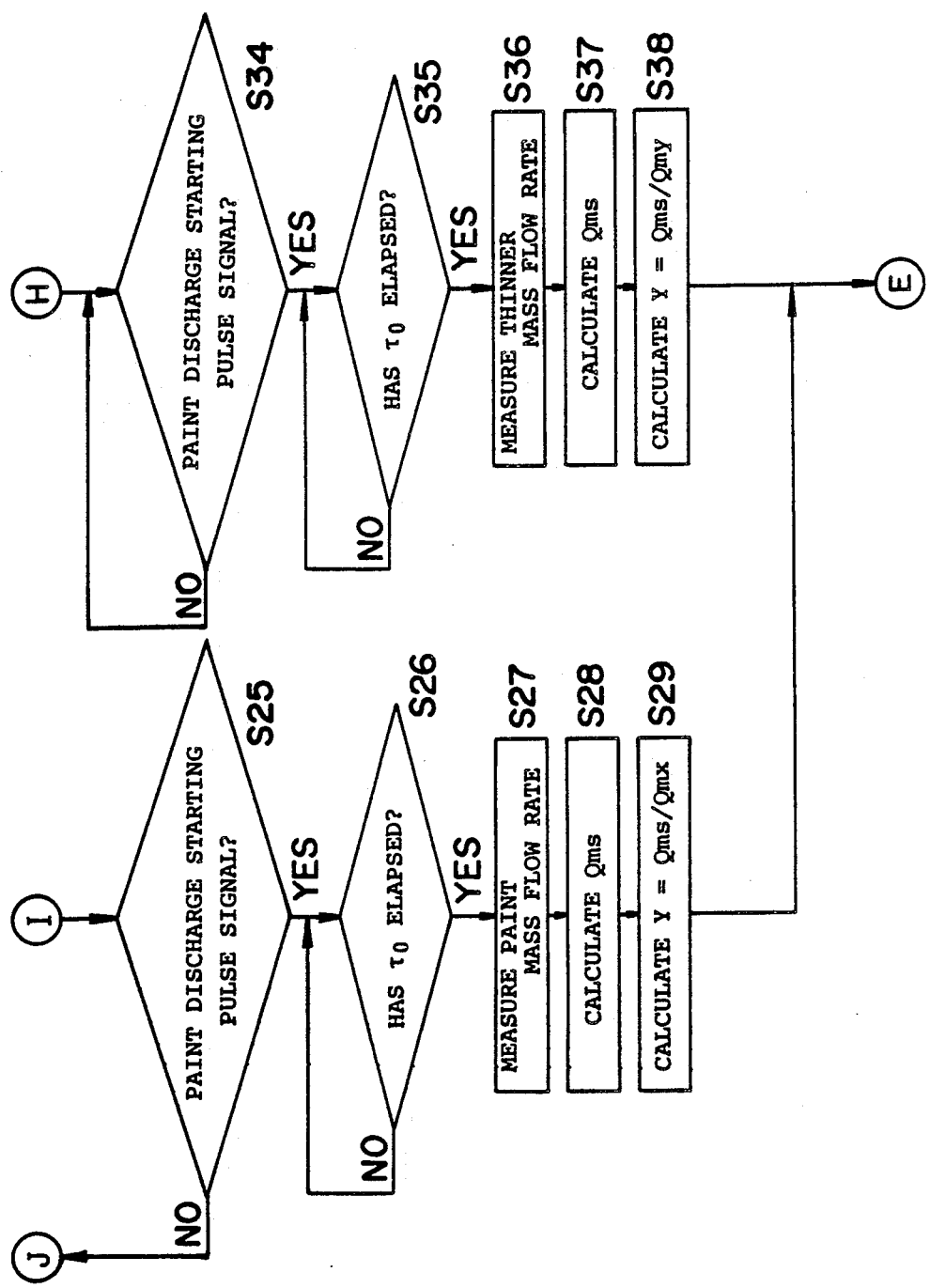

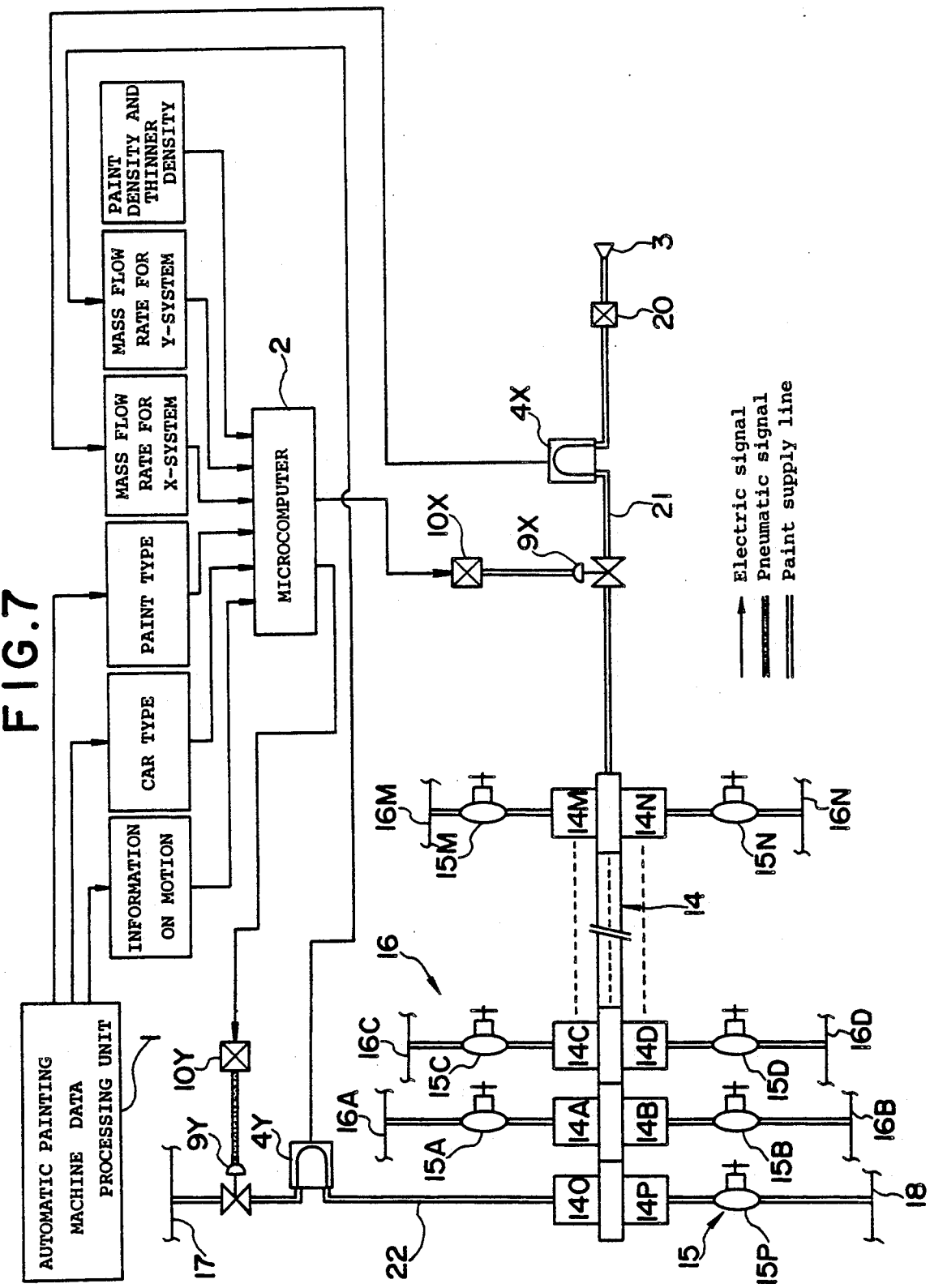

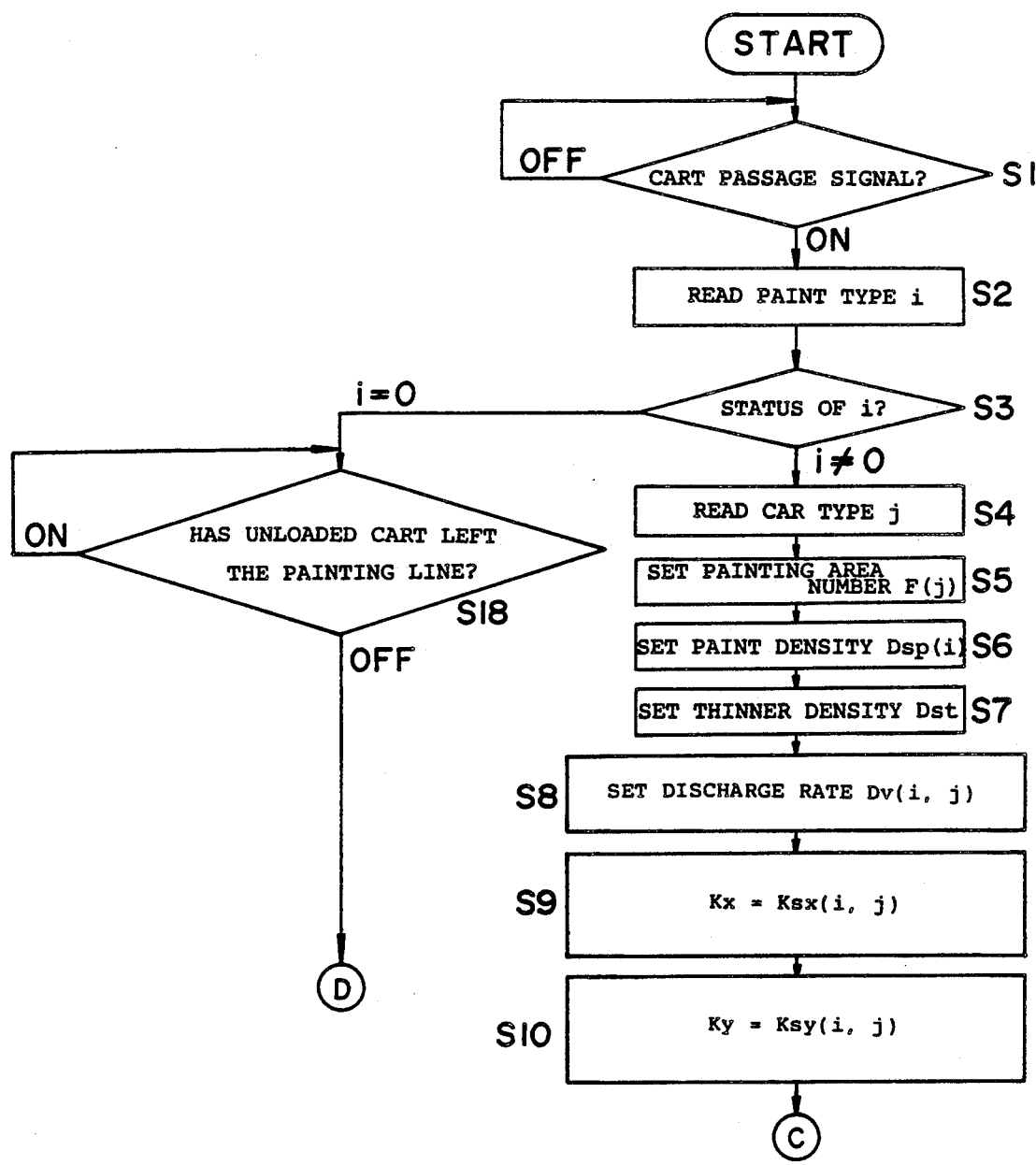

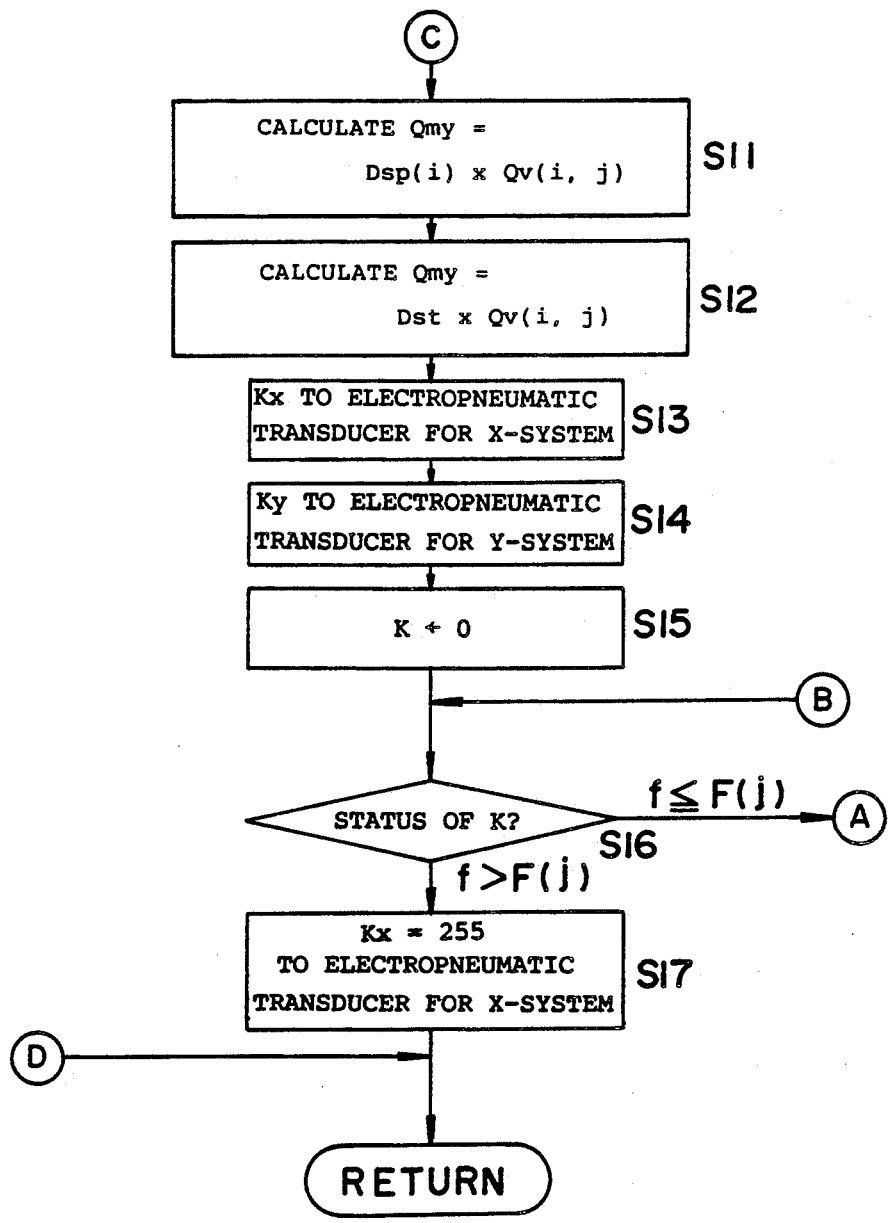

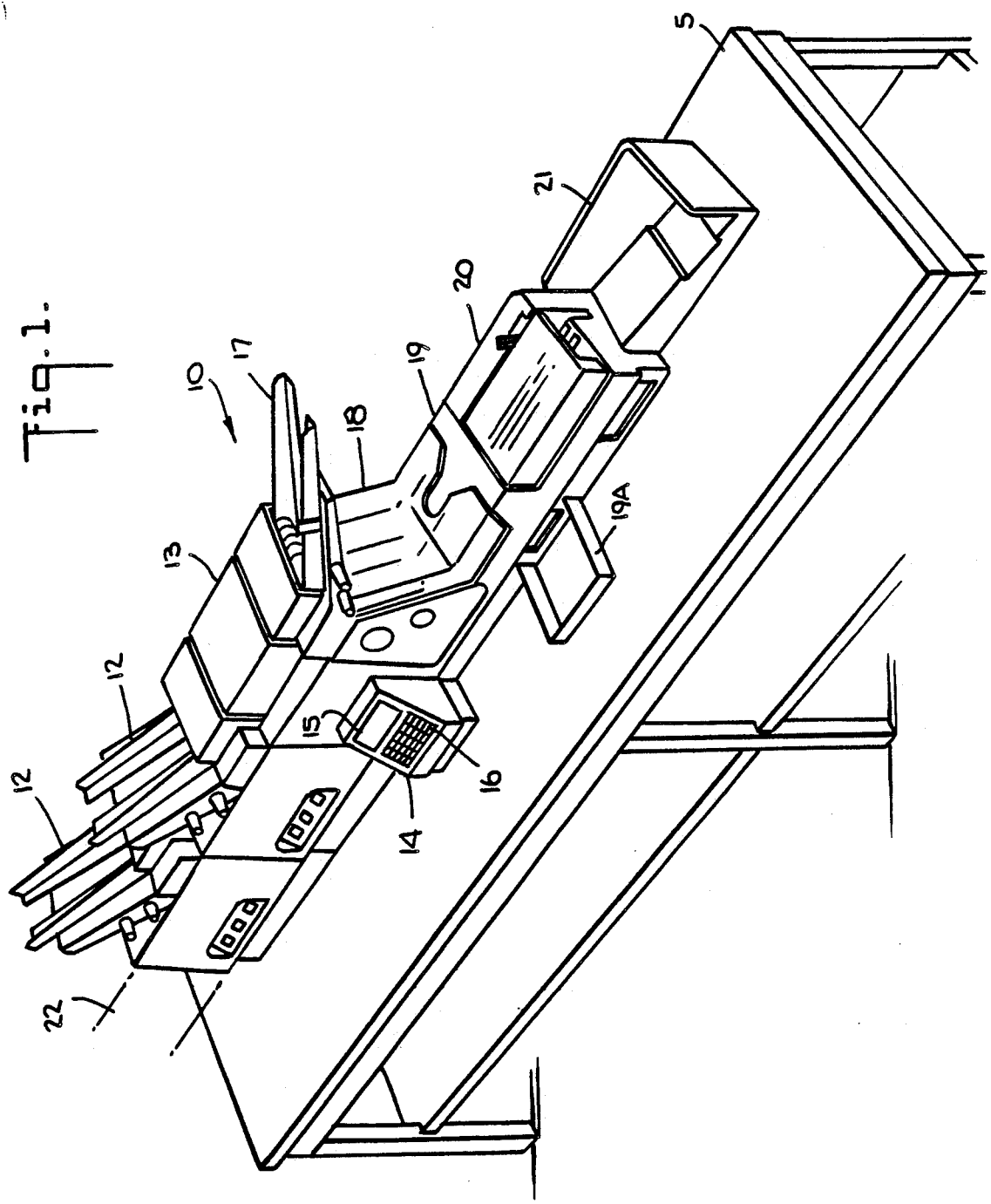

PAINT DISCHARGE RATE CONTROL SYSTEM

BACKGROUND OF THE INVENTION

1. Field of the Invention

The present invention relates to improvements in a paint discharge rate control system.

2. Description of the Prior Art

Recently, an automatic painting machine, in general, has been employed to paint automobile bodies and the like. Typical automatic painting machines are disclosed in Japanese Patent Laid-open (Kokai) Nos. 60-61076 and 60-61077.

A known automatic painting machine is shown in FIG. 1 by way of example. This known automatic painting machine comprises an automatic painting machine data processing unit 1, a microcomputer 2, a painting nozzle 3, a mass flow meter 4, a pneumatic regulator 9, an electropneumatic transducer 10, color change valves 14, regulators 15, paint supply tubes 16, a cleaning thinner supply tube 17, a cleaning air supply tube 18, a painting control valve 20, and a paint feed line 21. The discharge rate of the paint is controlled basically by the pneumatic regulator 9 and the electropneumatic transducer 10 on the basis of a discharge signal issued to the microcomputer 2 by the processing unit 1. However, since it is difficult to control the discharge rate accurately only on the basis of the discharge signal, a signal indicates of the mass flow rate detected by the mass flow meter 4, such as a Coriolis-type mass flow meter, is compared by the microcomputer with a predetermined mass flow rate stored beforehand in the microcomputer 2, and then the microcomputer 2 issues a signal representing a correction corresponding to the difference of the detected mass flow rate from the predetermined mass flow rate to the electropneumatic transducer 10 to correct the mass flow rate.

This conventional automatic painting machine thus constituted has the following problems. Since the automatic painting machine has only a single paint feed tube, namely, the paint feed tube 21, paint remaining in the paint feed tube 21 must be blown out through the painting nozzle 3 by opening the air valve 14P and the thinner valve 14O after closing the color change valves 14A to 14N when changing a color paint being used for another. Such an operation for blowing out a color paint is designated as a "push-out operation". However, an enormous amount of paint is wasted in a year by the push-out operation, which has become a significant cost problem in recent years where expensive high-grade paints are used. To utilize the residual paint effectively, there is proposed a method in a push-out operation, in which the color change valve 14 for the color paint being used is closed near the end of the painting operation to use the color paint remaining in the paint feed tube for painting in the final stage of the painting operation.

This proposed method, however, causes the microcomputer 2 and the mass flow meter 4 to detect a false the flow of the paint, which disturbs the control of flow of the paint subject to the push-out operation. That is, when the thinner flows through the mass flow meter 4 during the progression of the push-out operation, the mass flow meter 4 detects the mass flow rate of the thinner and issues a detection signal representing the mass flow rate of the thinner, which is different from that of the paint. Then, the microcomputer makes a decision on the basis of the detected mass flow rate of the thinner, without correcting the detected mass flow rate of the thinner on the basis of the difference in density between the thinner and the paint, that the flow rate of the paint is excessively small, and then issues an erroneous correction signal based on the erroneous decision to the electropneumatic transducer 10. Consequently, the paint is sprayed from the painting nozzle 3 at an excessively high flow rate coating the automobile body with a paint film having an irregular thickness, and thus the quality of the paint coating is deteriorated.

The conventional paint discharge rate control system requires entering of the densities of individual paints into the microcomputer 2 because the density of paint is dependent on the color of paint, the ambient temperature and the ambient humidity. The microcomputer 2 calculates a set mass flow rate by multiplying the density of paint by a set flow rate. However, it is troublesome to change the stored value of the density of paint by color or season.

SUMMARY OF THE INVENTION

Accordingly, it is an object of the present invention to provide a paint discharge rate control system capable of discharging paint constantly at an optimum discharge rate without requiring a setting of the density of a fluid (the paint or a washing liquid) that flows through a mass flow meter and capable of forming a paint film having uniform and appropriate thickness by accurately controlling the flow rate of the paint particularly during a push-out operation.

According to one aspect of the present invention, in a paint discharge rate control system comprising a paint mass flow meter provided in a paint supply line interconnecting a painting nozzle and a color changing valve group, and a paint flow regulator provided in the paint supply line to regulate the discharge rate of paint according to the mass flow rate of the paint measured by the paint mass flow meter, a control means converts a mass flow rate measured by the paint mass flow meter into a volumetric flow rate and controls the paint flow regulator so that the paint is discharged at the same discharge rate as that in discharging only the paint, in pushing out the paint remaining in the paint supply line with washing liquid by closing the corresponding paint valve of the color changing valve group and opening a washing liquid valve to spray the residual paint on a workpiece. In spraying the residual paint on the workpiece by pushing out the paint remaining in the paint supply line with the washing liquid, the paint discharge rate control system converts the mass flow rate measured by the mass flow meter into the volumetric flow rate and controls the paint supply regulator on the basis of the volumetric flow rate. Since the volumetric flow rate is not affected by the variation of the density of the fluid flowing through the mass flow meter, the discharge rate of the paint during the push-out operation is not disturbed even if the washing liquid flows through the mass flow meter, and hence the residual paint sprayed during the push-out operation is used effectively. Furthermore, since the push-out operation need not be discriminated, a control program on which the paint discharge rate control system operates can be simple and the paint is discharged always at a fixed discharge rate without setting the density of the paint in the paint discharge rate control system in changing the color paint for another color paint.

According another aspect of the present invention, in a paint discharge rate control system comprising a mass flow meter provided in a paint supply line interconnecting a painting nozzle and a color changing valve group, and a paint supply regulator provided in the paint supply line to regulate the discharge rate of the paint on the basis of mass flow rate measured by the mass flow meter, a washing liquid supply regulator and a mass flow meter for measuring the mass flow rate of a washing liquid are provided in a washing liquid supply line connected to the washing liquid valve of the color change valve group, the washing liquid supply regulator controls the flow rate of the washing liquid on the basis of the mass flow rate of the washing liquid measured by the mass flow meter for the washing liquid in pushing out the paint remaining in the paint supply line to control the discharge rate of the residual paint. The paint supply regulator and the paint mass flow meter provided in the paint supply line control the flow rate of the paint before the push-out operation is started, and the washing liquid supply regulator and the washing liquid mass flow meter control the flow rate of the washing liquid, and hence, that of the residual paint, after the push-out operation has been started. Since the flow rate of the washing liquid is thus controlled independently, a disturbance in the control of the flow rate of the residual paint attributable to the difference in density between the paint and the washing liquid is prevented, and thus the accuracy of flow rate control for pushing out the residual paint is improved, the paint can be sprayed uniformly in an appropriate thickness in the push-out operation for exhausting the residual paint to improve the quality of the paint film formed during the push-out operation and the residual paint is used effectively to reduce the painting cost.

BRIEF DESCRIPTION OF THE DRAWINGS

FIG. 1 is a diagrammatic illustration showing the general constitution of a conventional paint discharge rate control system;

FIG. 2 is a diagrammatic illustration showing the general constitution of a paint discharge rate control system in a preferred embodiment according to the present invention;

FIGS. 3(a) and 3(b) are a diagrammatic illustration and a perspective view, respectively, showing the general constitution of a mass flow meter employed in the paint discharge rate control system of FIG. 2;

FIGS. 4(a), 4(b) and 4(c) are flow charts of a control program to be executed by a microcomputer incorporated into the paint discharge rate control system of FIG. 2;

FIGS. 6(a), 6(b), 6(c), 6(d), 6(e) and 6(f) are flow charts of a control program to be executed by a microcomputer incorporated into the paint discharge rate control system of FIG. 5;

FIG. 7 is a diagrammatic illustration showing the general constitution of a paint discharge rate control system in a third embodiment according to the present invention.

DETAILED DESCRIPTION OF THE PREFERRED EMBODIMENT

Figure 4B:
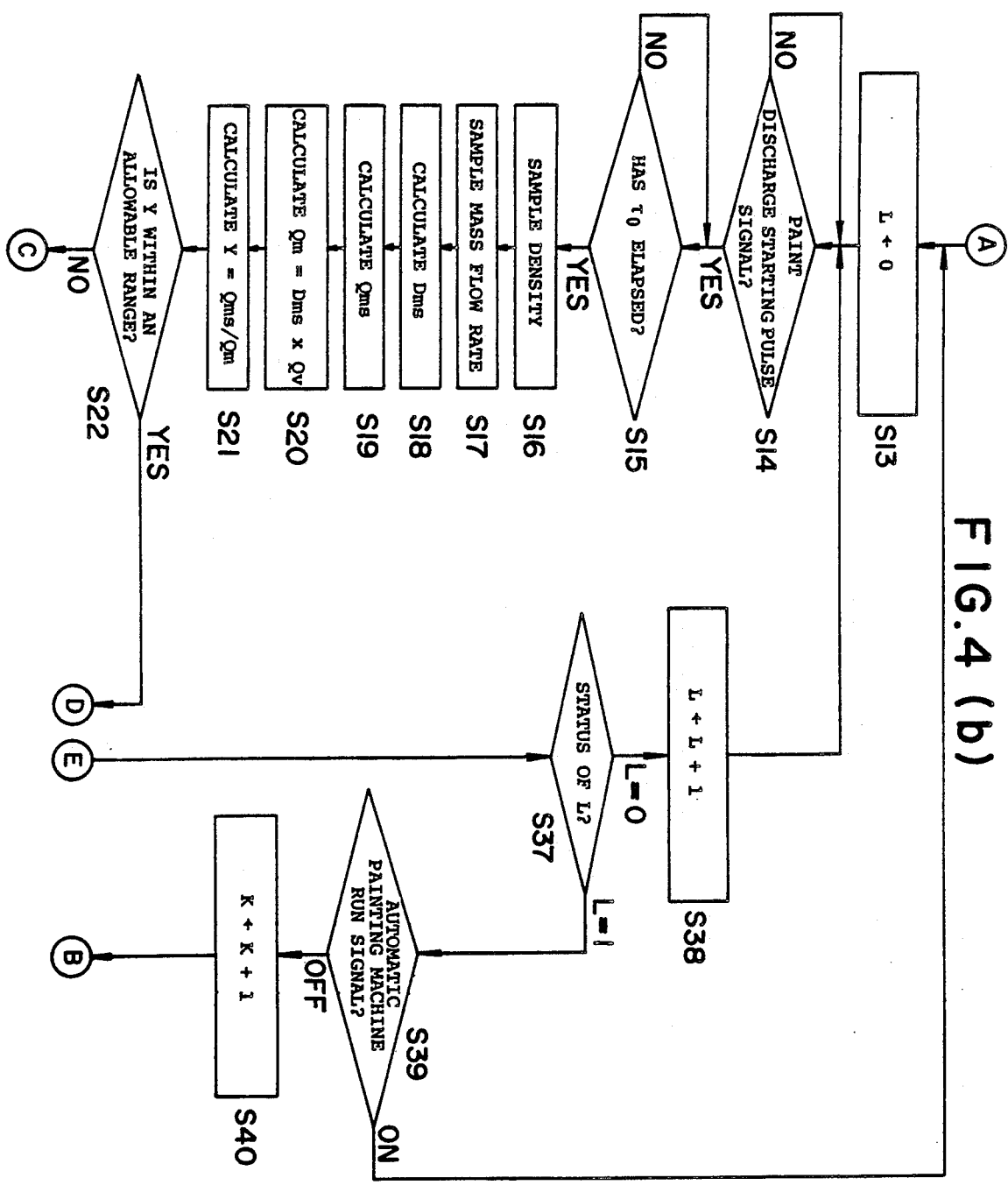

First Embodiment:

A paint discharge rate control system in a first embodiment according to the present invention will be described with reference to FIG. 2, in which parts like or corresponding to those of the conventional paint discharge rate control system previously described with reference to FIG. 1 are denoted by the same reference numerals and the description thereof will be omitted.

The paint discharge rate control system shown in FIG. 2 is substantially the same as the conventional paint discharge rate control system except that the paint discharge rate control system embodying the present invention does not require the entry of the density of paint into a microcomputer 2, and has a mass flow meter 4 which continuously enters the density of the fluid flowing therethrough into the microcomputer 2.

A pneumatic flow regulator 9 and a mass flow meter 4 are provided in a paint supply line 21. The mass flow meter 4 issues a signal representing a measured mass flow rate to the microcomputer 2. The microcomputer 2 compares the measured mass flow rate and a set mass flow rate of paint stored beforehand in the microcomputer 2, and then issues a correction signal to an electropneumatic transducer 10 to correct the actual mass flow rate.

The mass flow meter 4 is a Coriolis-type mass flow meter having, as shown in FIG. 3(a), a sensing unit 5, an electronic unit 6, a digital monitor 7 for monitoring mass flow rate, and a digital monitor 8 for measuring temperature and density. The sensing unit 5 has a U-tube 5a supported at the extremities thereof in a cantilever manner and is connected at the extremities to a paint supply line 21. The electronic unit 6 detects the mass flow rate and density of a fluid flowing through the U-tube 5a from the natural frequency of the U-tube 5a. That is, the mass flow meter 4 (flow meter means) serves as a density detecting means as well as a mass flow meter.

The density measuring principle of the Coriolis-type mass flow meter will be described in detail hereinafter. As shown in FIG. 3(b), a fluid flows through a U-tube 30 of a Coriolis-type mass flow meter 4 and causes the U-tube 30 filled with the fluid to vibrate in directions indicated by a double-head arrow c to allow the density and mass flow rate of the fluid to be measured. Although the Coriolis-type mass flow meter employed in this embodiment (Micromotion flow meter$^R$) is capable of measuring the temperature of the fluid by means of a thermoresistance applied to the surface of the U-tube 30, the principle of temperature measurement is entirely independent of those on which the mass flow rate and density of the fluid are measured. The density is measured on the following principle. The U-tube 30 vibrates at the natural frequency thereof. When the density of the fluid flowing through the U-tube 30 changes, the mass of the U-tube 30 filled with the fluid changes and, therefore, the natural frequency of the U-tube 30 changes. The natural frequency or period of the U-tube 30 is detected to determine the density of the fluid. The relation between the density of the fluid and the natural frequency of the U-tube 30 can be represented by a substantially proportional straight line in a fixed range of density. The mode of vibration is similar to the mode of free vibration of a cantilever having a mass concentrated on the free end thereof.

Figure 4C:
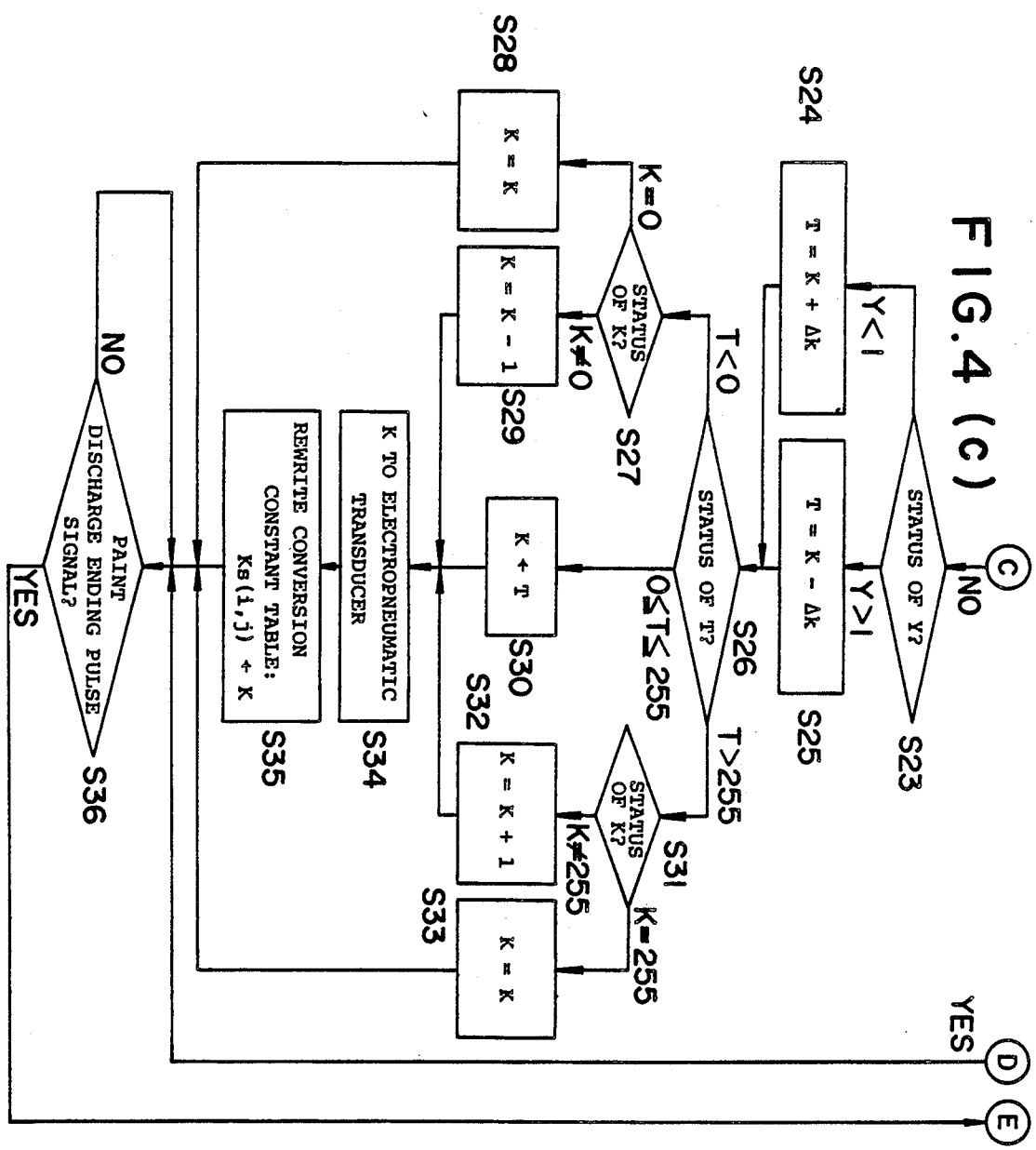

The operation of the microcomputer 2 will be described hereinafter with reference to FIGS. 4(a), 4(b) and 4(c). Referring first to FIG. 4(a), a decision is made in step S1 as to whether a cart mounted with an automobile body has passed the entrance of a painting line. In steps S2, S3 and S4, painting data including the color and type of paint to be used and the type of car is read. A paint parameter i indicating the type of paint, for example, a dark blue metallic paint, and a car type parameter j indicating the types of automobile body are determined. In step S5, the number F(j) of painting areas, such as a hood area, a roof area and a deck area, is set on the basis of the type parameter j, and then a paint discharge rate Qv(i, j) is set in step S6 on the basis of the paint parameter i and the type parameter j. Then, in step S7, an electropneumatic conversion constant Ks(i, j) is set for an electropneumatic transducer 10 o the basis of the paint parameter i and the type parameter j. In step S8, a conversion signal K is issued to the electropneumatic transducer 10. In step S9, a painting area frequency parameter k is initialized. In step S10, a decision is made as to whether the painting area frequency is satisfied. When the decision in step S10 is affirmative (YES), a signal based on an electropneumatic conversion constant Kx=255 is issued to the electropneumatic transducer 10 to fully open the pneumatic flow regulator 9. When an unloaded cart is detected in step S3, a decision is made in step S12 as to whether the unloaded cart has left the painting line. Step S12 is repeated until the unloaded cart leaves the painting line.

When the decision in step S10 is NO, namely, when the painting area frequency is not satisfied, a reciprocation parameter L of the associated automatic painting machine is initialized in step S13, and then a decision is made in step S14 as to whether the microcomputer 2 has received a paint discharge starting pulse signal from the data processing unit 1 of the automatic painting machine. When the decision in step S14 is YES, a query is made in step S15 as to whether a time $\tau_0$ has elapsed after the microcomputer 2 received the paint discharge starting pulse signal from the data processing unit 1. When the answer to query made in step S15 is YES, the density and mass flow rate of the fluid flowing through the mass flow meter 4 are sampled a plurality of times in steps S16 and S17, the respective means of the data of density and that of mass flow rate are calculated in steps S18 and S19, a set volumetric flow rate Qv is converted into a mass flow rate Qm in step S20, and then the flow rate deviation Y of the paint is calculated in step S21.

To avoid the respraying or a void spraying of the lateral ends of the automobile body, the paint discharge starting pulse signal is generated intermittently in synchronism with the reciprocation of the painting nozzle 3 at intervals each corresponding to the period of reciprocation of the painting nozzle 3. Accordingly, steps S16 to S21 are executed every time the paint discharge starting pulse signal is generated.

The time $\tau_0$ is a time period necessary for the output of the mass flow meter 4 to converge and stabilize.

In step S22, a decision is made as to whether the flow rate deviation Y is within an allowable range. When the decision in step S22 is YES, steps for correcting the electropneumatic conversion constant K are skipped and the control program goes to step S36. When the decision in step S22 is NO, a decision is made in step S23 as to whether the electropneumatic conversion constant K is to be increased or decreased for correction. The electropneumatic conversion constant K is increased (step S24) or decreased (step S25) according to the decision in step S23 to provide a new electropneumatic conversion constant T. In step S26, the appropriateness of the new conversion constant T is examined. When $0 \leq T \leq 255$, the new electropneumatic conversion constant T is employed as the electropneumatic conversion constant K in step S30. When $T<0$ or when $T>255$, step S27 and the following steps, or step S31 and the following steps are executed. After the electropneumatic conversion constant K has thus been corrected, a signal based on the new electropneumatic conversion constant K is issued to the electropneumatic transducer 10 in step S34 and the new electropneumatic conversion constant K is stored in the microcomputer 2 in step S35.

In step S36, a decision is made in step S36 as to whether a paint discharge ending pulse signal has been receive from the data processing unit 1 of the automatic painting machine, namely, as to whether the painting nozzle 3 has completed one stroke. When the decision in step S36 is YES, a decision is made in step S37 as to whether the painting nozzle 3 has completed one reciprocation, namely, a forward stroke and a return stroke (a reciprocation parameter L=1). When the decision in step S37 is NO (L=0), namely, when the painting nozzle 3 has completed only the forward stroke, the reciprocation parameter L is incremented by one in step S38, and then the control program returns to step S14. When the decision in step S37 is YES (L=1), namely, when the painting nozzle 3 has completed one reciprocation, a decision is made in step S39 as to whether the painting operation is to be continued. When the decision in step S39 is YES, the control program returns to step S13 and, when NO, the painting area frequency parameter K is incremented in step S40, and then the control program returns to step S10.

A separate density measuring means may be provided in addition to the mass flow meter 4.

Figure 5:
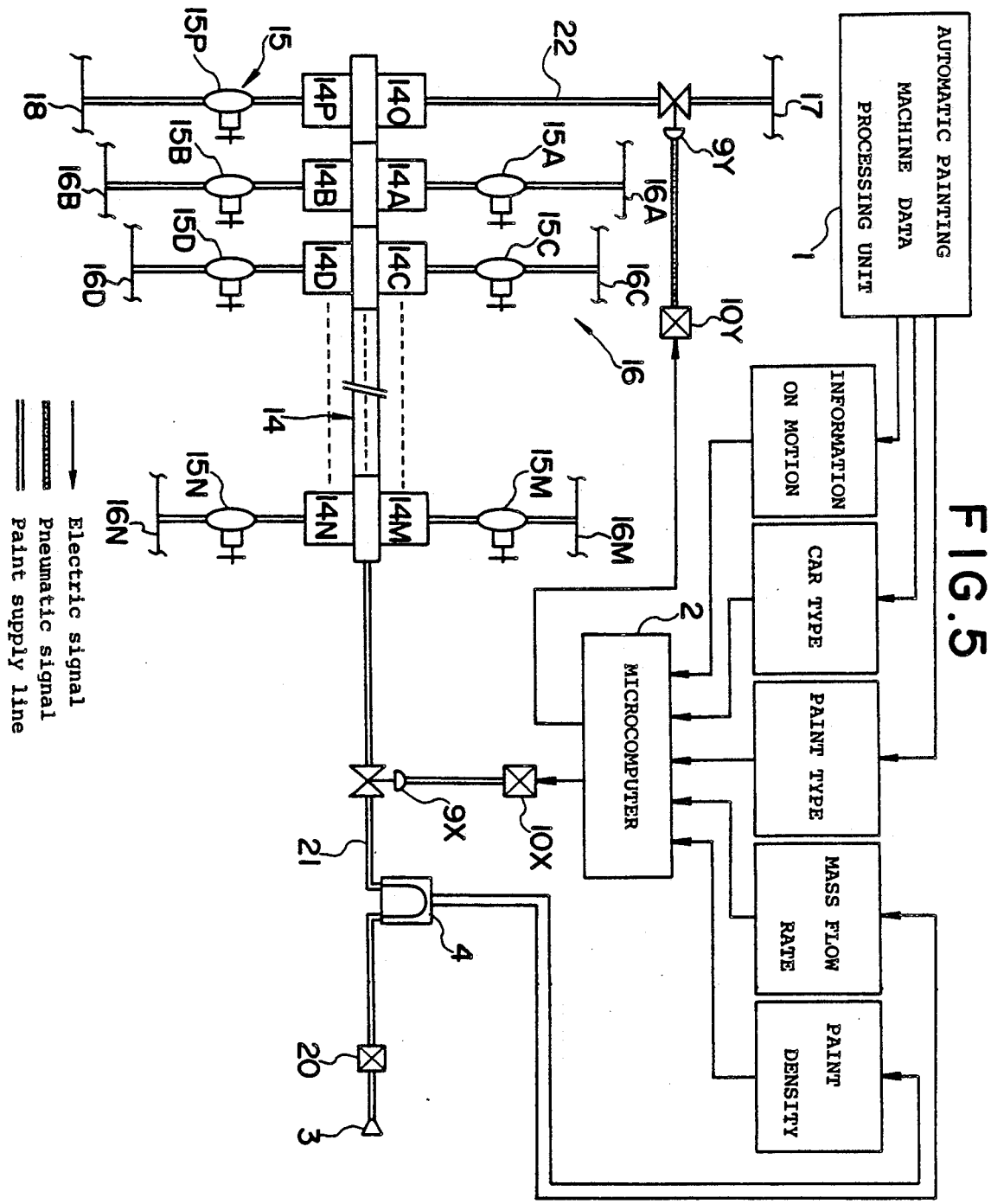
FIG. 5 is a diagrammatic illustration showing the general constitution of a paint discharge rate control system in a second embodiment according to the present invention.

Second Embodiment:

A paint discharge rate control system in a second embodiment according to the present invention will be described hereinafter with reference to FIG. 5, in which parts like or corresponding to those of the conventional paint discharge rate control system described previously with reference to FIG. 1 are denoted by the same reference numerals and the description thereof will be omitted.

The paint discharge rate control system in the second embodiment is different from the conventional paint discharge rate control system shown in FIG. 1 in that a pneumatic flow regulator 9Y for thinner is provided in a thinner supply line 22, and in that a microcomputer 2 (control unit) is provided with a timer.

The pneumatic flow regulator 9Y is controlled by a pneumatic signal provided by an electropneumatic transducer 10Y. A pneumatic flow regulator 9X and a mass flow meter 4 are provided in a paint supply line 21. The microcomputer 2 compares a measured mass flow rate measured by the mass flow meter 4 and a set mass flow rate of paint or thinner stored beforehand in the microcomputer 2, and issues a correction signal to the electropneumatic transducer 10X or 10Y to correct the mass flow rate. Characters and reference numerals denoting components and physical values relating to a paint supply system (the paint supply line 21), and those denoting components and physical values relating to a thinner supply system (the thinner supply line 22) will be accompanied, respectively, by "X" or "x", and "Y" or "y".

The operation of the microcomputer 2 will be described hereinafter with reference to FIGS. 6(a), 6(b), 6(c), 6(d), 6(e) and 6(f).

Figure 6A:
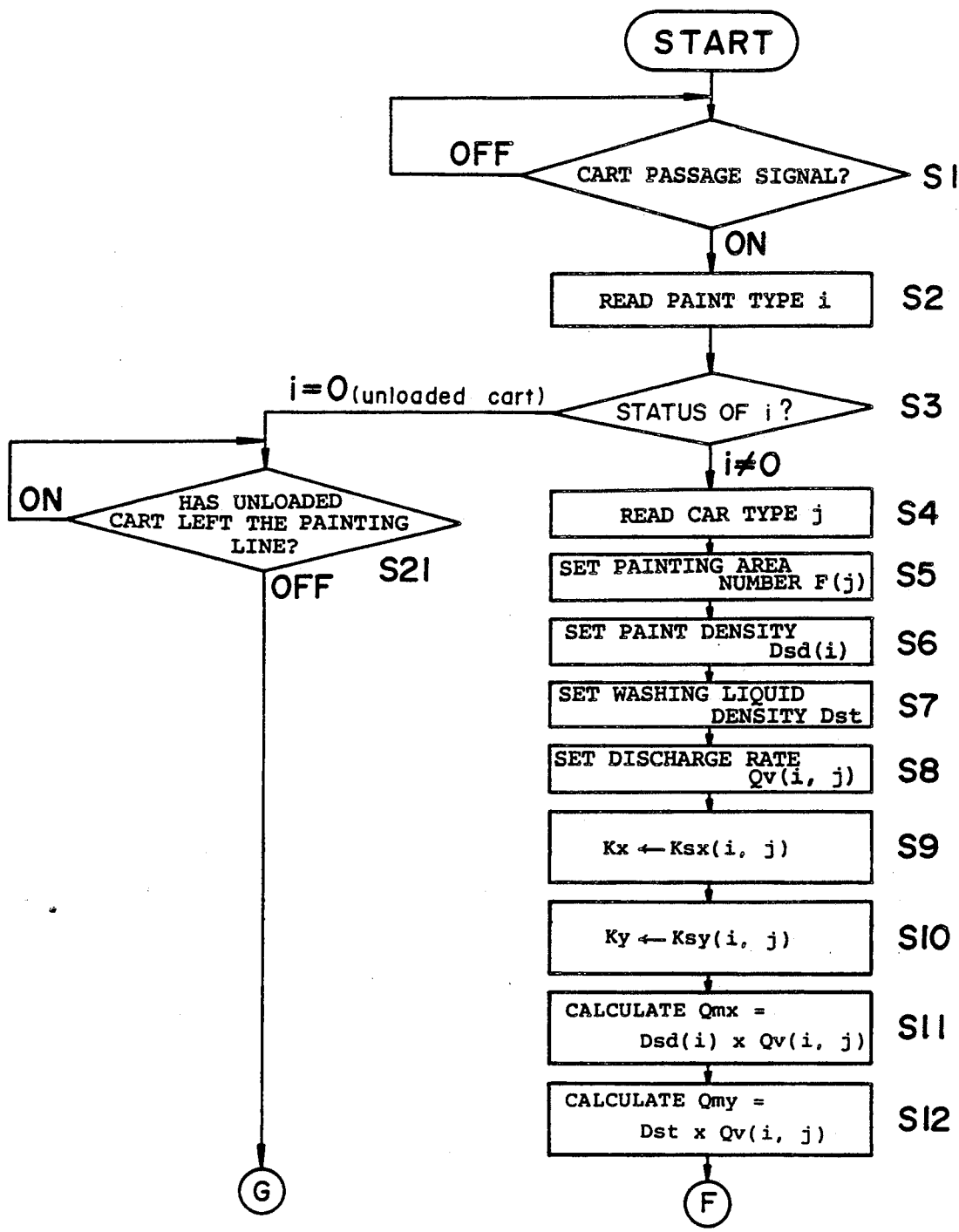

Referring first to FIG. 6(a), a decision is made in step S1 as to whether a cart mounted with an automobile body has passed the entrance of a painting line. In steps S2, S3 and S4, data including the color and type of paint to be used and the type of car is read to set a paint parameter i and a car type parameter j. In step S5, a painting area number F(j) is set on the basis of the car type parameter j and a paint density Dsp(i) is set in step S6 on the basis of the paint parameter i. The process from step S1 through S6 is entirely the same as the conventional process.

In step S7, a density Dst of thinner for washing is set for calculating a set mass flow rate which is compared with a measured mass flow rate measured by the mass flow meter 4 during the push-out operation. In step S8, a set paint discharge rate Qv(i, j) is determined on the basis of the paint parameter i and the car type parameter j. In steps S9 and S10, electropneumatic conversion constants Kx and Ky of the electropneumatic transducers 10X and 10Y are set to Ksx(i, j) and Ksy(i, j), respectively, on the basis of the paint parameter i and the car type parameter j. In steps S11 and S12, the respective mass flow rates Qmx and Qmy of the paint and the thinner are calculated. In step S13, a time $\tau_1$ necessary for the thinner to flow to the mass flow meter 4 after the push-out operation has been started is calculated. In the calculation performed in step S13, V is the internal volume of the paint supply tube of the paint supply line 21 between a color change valve CCV and the mass flow meter 4, and S is a safety factor, ordinarily in the range of 1.1 to 1.2, to ensure that only the thinner flows through the mass flow meter 4 during the push-out operation. In steps S14 and s15, signals based on electropneumatic conversion constants Kx and Ky are issued to the electropneumatic transducers 10X and 10Y, respectively. In step S16, the painting area frequency parameters k is initialized. In steps S17 and S18, a paint push-out evaluation parameter Pu and a paint push-out time passage evaluation parameter Pt are initialized, respectively. The flag Pu=1 is set when the push-out operation is ordered and the flag Pu=0 os set when the push-out operation is not ordered. The flag Pt=1 is set when a timing operation is started after the push-out operation has been started and the flag Pt=0 is set when a timing operation is not started. In step S19, a decision is made as to whether the painting area frequency is satisfied. When the decision in step S19 is YES, a signal based on the electropneumatic conversion constant Kx=255 is issued to the electropneumatic transducer 10X to fully open the pneumatic flow regulator 9X in step S20. Step S21 is executed when an unloaded cart is detected in step S3, to decide whether the unloaded cart has left the painting line.

Figure 6B:
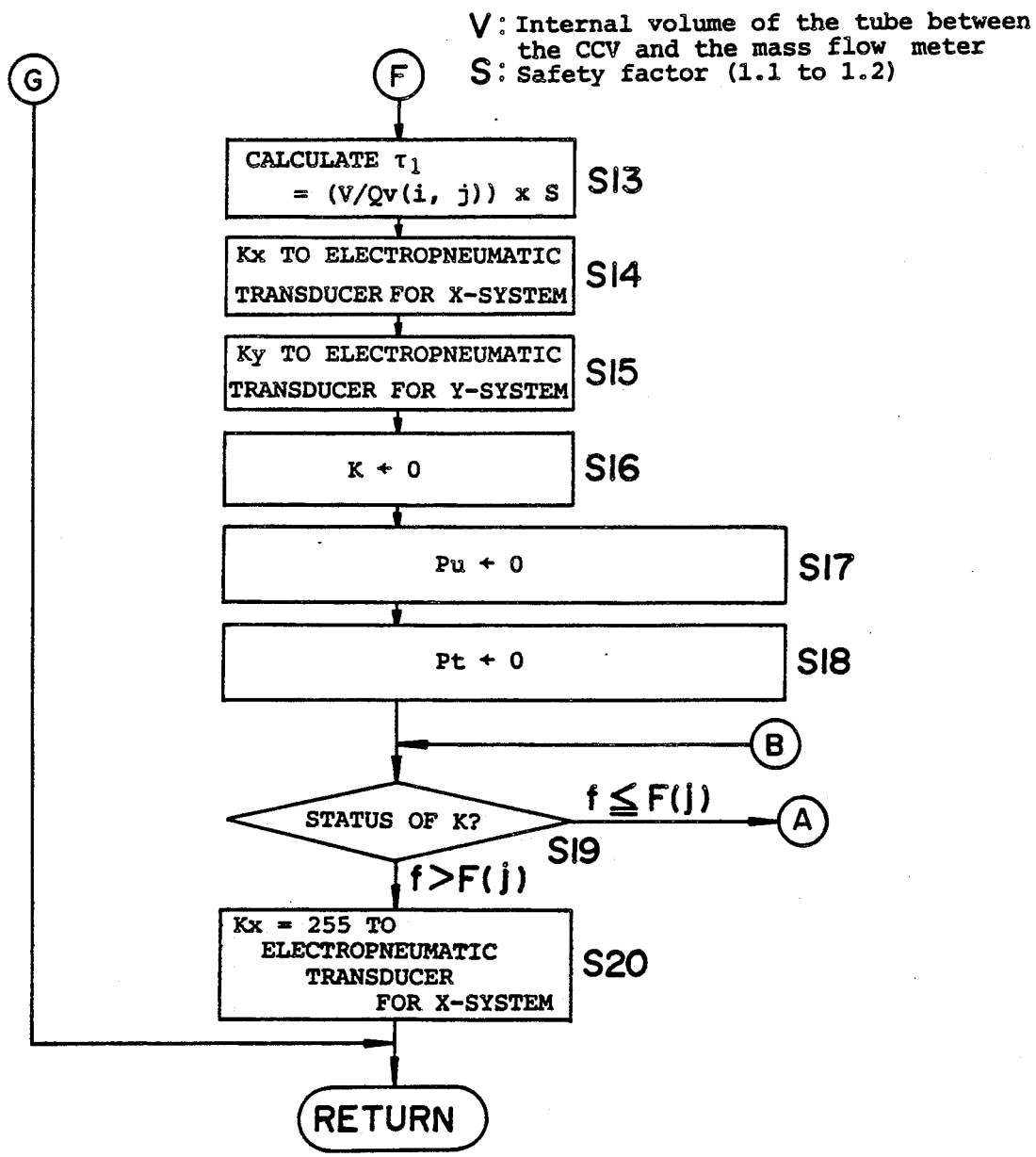
Figure 6C:
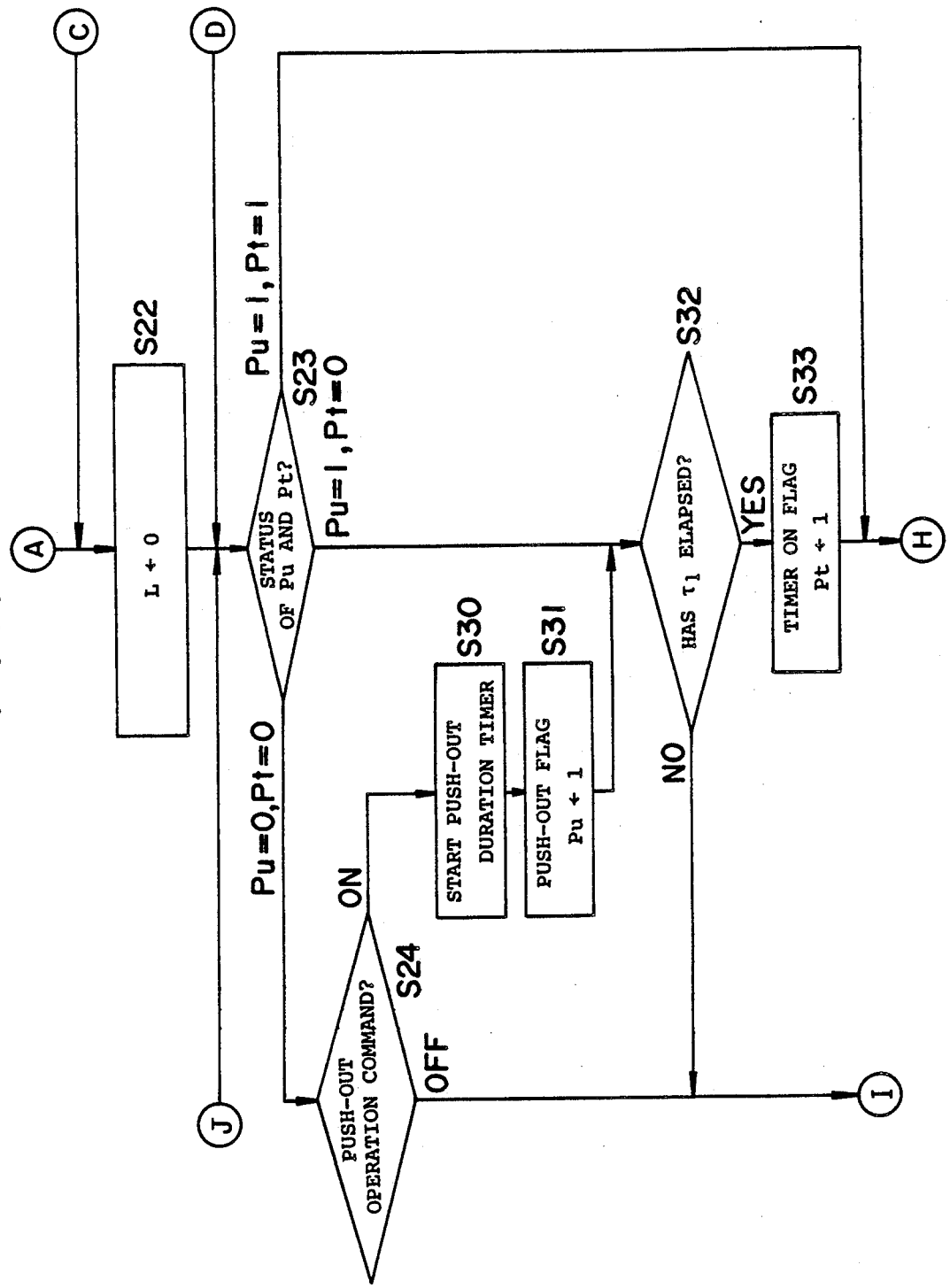

Referring to FIG. 6(b), when the decision in step S19 is NO, the reciprocation parameter L for the automatic painting machine is initialized in step S22. In step S23, the parameters Pu and Pt are examined. When Pu=0 and Pt=0, a query is made in step S24 if the microcomputer 2 has received a push-out signal from the data processing unit 1 of the automatic painting machine. When the response to the query made in step S24 is NO, a query is made in step S25 as to whether the microcomputer 2 has received a paint discharge starting pulse signal, from the data processing unit 1. When the response to the query made in step S25 is YES, steps S27, S28 and S29 are executed at time $\tau_0$ after the reception of the paint discharge starting pulse signal to calculate a paint flow rate deviation Y.

To avoid the respraying or a void spraying of the lateral of the automobile body, the paint discharge starting pulse signal is generated intermittently in synchronism with the reciprocation of the painting nozzle 3 at intervals each corresponding to the period of reciprocation of the painting nozzle 3. Accordingly, steps S27, S28 and S29 are executed for sampling data every time the paint discharge starting pulse signal is generated.

A time $\tau_0$, the passage of which is examined in step S26, is a time period necessary for the output of the mass flow meter 4 to converge and stabilize.

On the other hand when the decision in step S24 is YES, namely, in the case where the microcomputer 2 has received the push-out signal, the timer is started in step S30 to time the push-out operation. The timer may be an internal timing circuit incorporated into the microcomputer 2, or an external timing device. In step S31, the flag Pu=1 is set, and then subsequent steps corresponding to conditions indicated by the flag Pu=1 are executed. In step S32, a decision is made as to whether the time $\tau_1$ has elapsed since the start of the push-out operation. When the decision in step S32 is YES, the flag Pt=1 is set in step S33, and then subsequent steps corresponding to conditions indicated by the flag Pt=1 are executed. When the decision in step S32 is NO, the control program goes to step S25. In step S34, a decision is made as to whether the microcomputer 2 has received the paint discharge starting pulse signal from the data processing unit 1. When the decision in step S34 is YES, steps S36, S37 and S38 are executed to calculate the thinner flow rate (=paint flow rate) deviation Y after the time $\tau_0$. In step S29, the average paint mass flow rate Qms is divided by the set paint mass flow rate Qmx to obtain the paint flow rate deviation Y, while the average thinner mass flow rate Qms is divided by the set thinner mass flow rate to obtain the thinner flow rate deviation Y. Accordingly, the paint mass flow rate deviation Y can be calculated accurately even after the thinner has flowed through the mass flow meter 4.

Figure 6E:
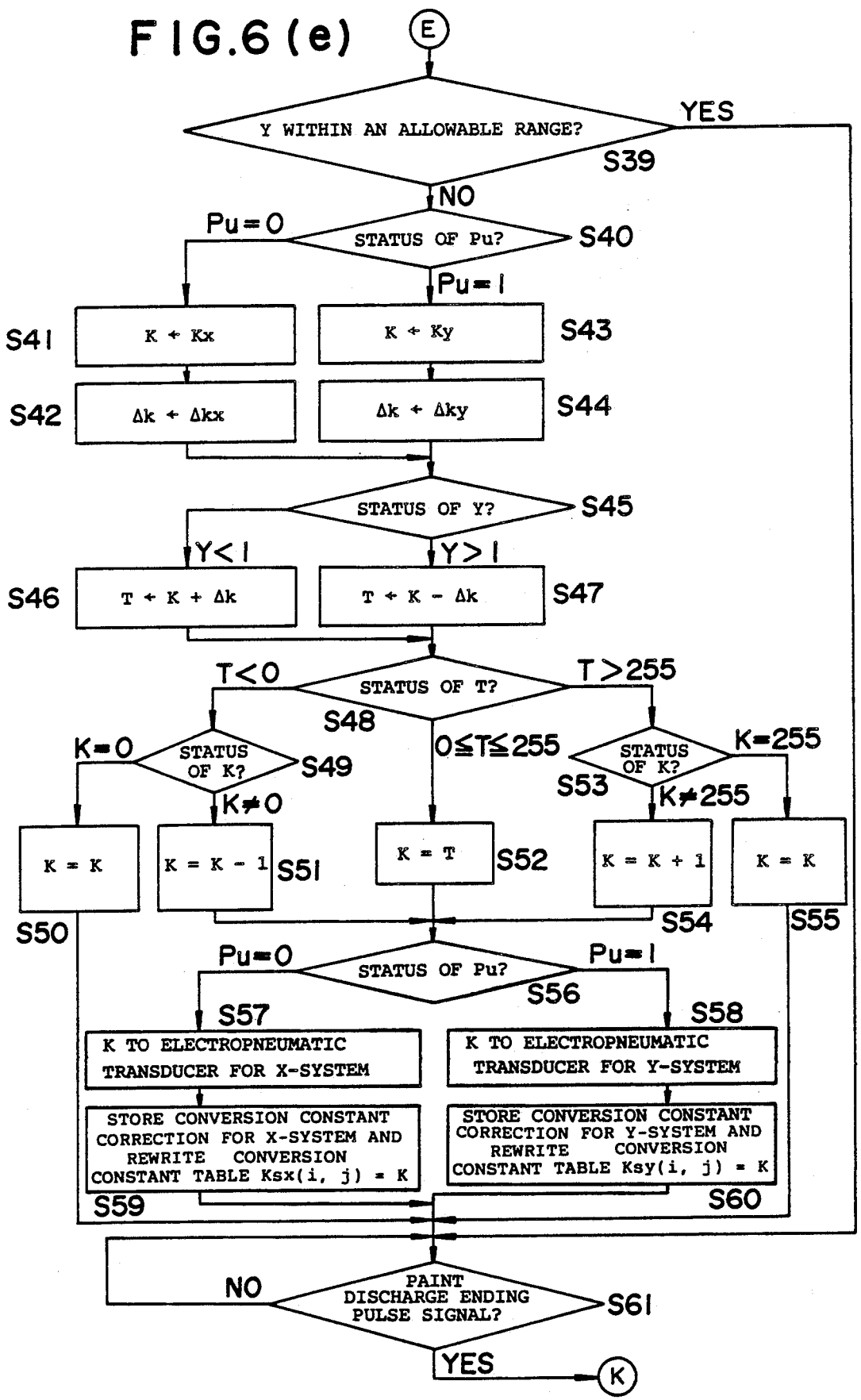
Figure 6F:
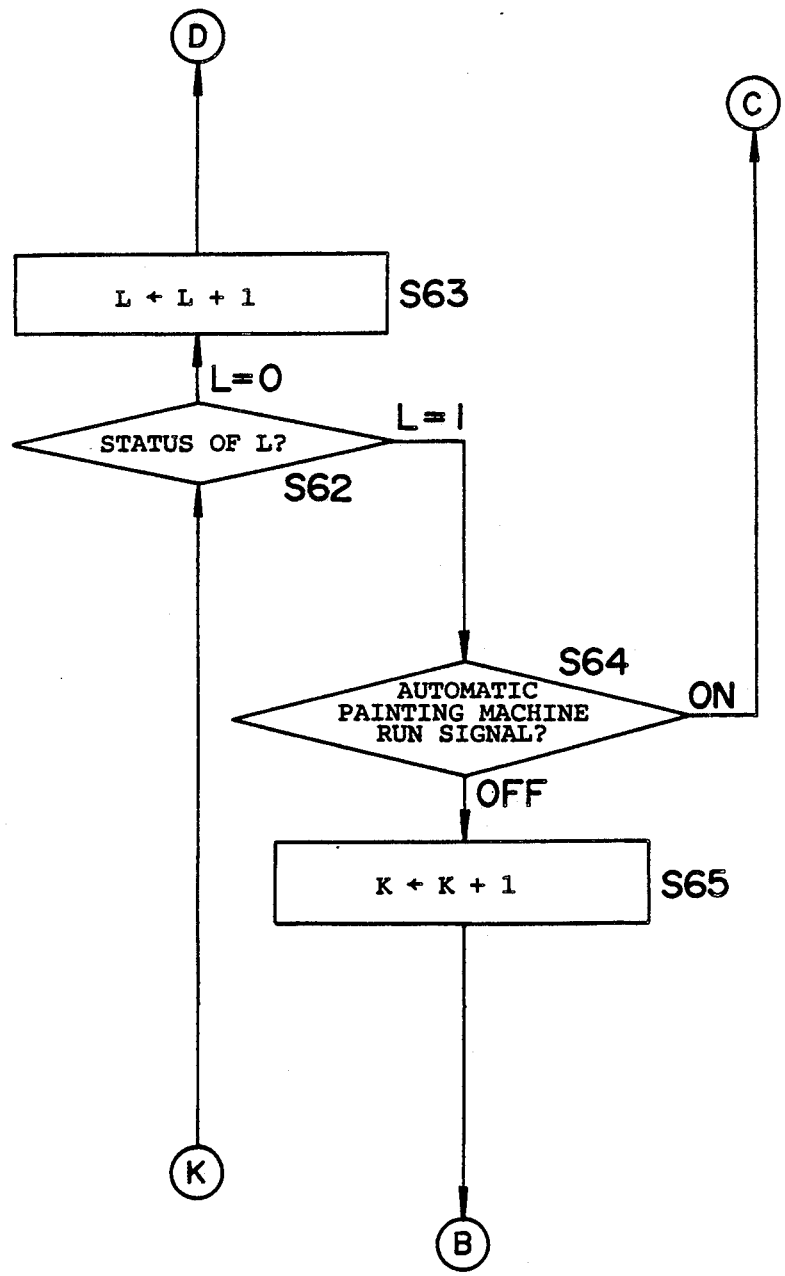

Referring to FIG. 6(e), in step S39, a decision is made as to whether the paint or thinner mass flow rate deviation Y is within an allowable range. When the decision in step S39 is YES, the electropneumatic conversion constant K for the electropneumatic transducer is not corrected and the control program jumps to step S61 and, when NO, a decision is made in step S40 as to whether the parameter Pu=1 or the parameter Pu=0. When Pu=0, namely, when no push-out command is given, the electropneumatic conversion constant Kx for the electropneumatic transducer 10X is altered and a correction $\Delta$Kx for altering the electropneumatic conversion constant Kx is set in steps S41 and S42. When Pu=1, namely, when a push-out command is given, the electropneumatic conversion constant Ky for the electropneumatic transducer 10Y is altered and a correction $\Delta$Ky for altering the electropneumatic conversion constant Ky is set in steps S43 and S44. Then, in step S45, a decision is made as to whether the electropneumatic conversion constant needs to be increased or the electropneumatic conversion constant needs to be decreased, and then step S46 or S47 is executed in accordance with the results of the decision in step S45 to increase or to decrease the electropneumatic conversion constant. In step S48, a new electropneumatic conversion constant T is examined. When the new electropneumatic conversion constant T is within an appropriate range, namely, when $0 \leq T \leq 255$, the electropneumatic conversion constant K is set to the new electropneumatic conversion constant T in step S52. When $T<0$ or $T>255$, steps S49, S50 and S51, or steps S53, S54 and S55 are executed.

After the correction of the electropneumatic conversion constant K, a decision is made again in step S56 as to whether $Pu=1$ or $Pu=0$. When $Pu=0$, a signal based on the new electropneumatic conversion constant K is issued to the electropneumatic transducer 10X in step S57 and the new electropneumatic conversion constant K is stored in the microcomputer 2 in step S59. When $Pu=1$, a signal based on the new electropneumatic conversion constant K is issued to the electropneumatic transducer 10Y in step S58 and the new electropneumatic conversion constant K is stored in the microcomputer 2 in step S60.

In step S61, a decision is made as to whether the microcomputer has received a paint discharge ending signal from the data processing unit 1 (if the painting nozzle 3 has completed one stroke). When the decision in step S61 is YES, a decision is made in step S62 as to whether the painting nozzle 3 has completed the forward stroke and the return stroke. When the decision in step S62 is NO ($L=0$), the reciprocation parameter L is incremented in step S63, and then the control program returns to step S23. When the decision in step S62 is YES ($L=1$), a query is made in step S64 if as to whether the painting operation is to be continued. When the answer to the query made in step S64 is YES, the control program returns to step S22 and, when NO, the painting area frequency parameter k is incremented in step S65, and then the control program returns to step S19.

In this paint discharge rate control system thus constituted, the control unit compares the paint mass flow rate measured by the mass flow meter and the set paint mass flow rate stored beforehand in the control unit to determine the deviation of the paint mass flow rate until the time $\tau_1$ elapses from a moment when the push-out command is given, and the control unit compares the washing liquid mass flow rate measured by the mass flow meter and the set washing liquid mass flow rate stored beforehand in the control unit to determine the deviation of the washing liquid mass flow rate, and hence, the deviation of the paint mass flow rate, after the time $\tau_1$ has elapsed. Then, the pneumatic flow regulator provided in the paint supply line is controlled on the basis of the deviation of the paint mass flow rate and that of the washing liquid mass flow rate to control the paint discharge rate. Accordingly, the misoperation of the control unit attributable to the difference in density between the paint and the washing liquid is prevented even if the fluid flowing through the mass flow meter changes from just the paint to just the washing liquid. Therefore, the flow rate of the paint during the push-out operation can accurately be controlled to form a paint film having a uniform, appropriate thickness in exhausting the paint remaining in the paint supply line, and the residual paint is used effectively to reduce the painting cost.

Although the pneumatic flow regulator 9Y and the electropneumatic transducer 10Y are provided in the thinner supply system in the second embodiment because the paint supply line 21 and the thinner supply line 22 have different piping characteristics, the discharge rate of the residual paint can be controlled by the pneumatic flow regulator 9X and electropneumatic transducer 10X of the paint supply system when the electropneumatic conversion constant is determined by taking into consideration the difference in piping characteristics between the paint supply line 21 and the thinner supply line 22.

Third Embodiment:

A paint discharge rate control system in a third embodiment will be described hereinafter with reference to FIG. 7, in which parts like or corresponding to those of the conventional paint discharge rate control system shown in FIG. 1 are denoted by the same reference numerals and the description thereof will be omitted to avoid duplication.

The paint discharge rate control system in the third embodiment is different from the conventional paint discharge rate control system in that a pneumatic flow regulator 9Y for thinner, and a mass flow meter 4Y for thinner are provided in a thinner supply line 22.

The pneumatic flow regulator 9Y provided in the thinner supply line 22 is controlled by pneumatic signals provided by the electropneumatic transducer 10Y. On the other hand, a microcomputer 2 compares a thinner mass flow rate measured by the mass flow meter 4Y for thinner and a set thinner mass flow rate stored beforehand in the microcomputer 2 and issues a correction signal to the electropneumatic transducer 10Y to correct the thinner mass flow rate. A pneumatic flow regulator 9Y for regulating the flow of paint, and a paint mass flow meter 4X are provided in a paint supply line 21. The pneumatic flow regulator 9X is controlled by pneumatic signals provided by an electropneumatic transducer 10X. Characters and numerals denoting components and physical values relating to a paint supply system (the paint supply line 21), and those denoting components and physical values relating to a thinner supply system (the thinner supply line 22) will be accompanied respectively by "X" or "x", and "Y" or "y".

A control program to be executed by the microcomputer 2 will be described hereinafter with reference to FIGS. 8(a), 8(b), 8(c), 8(d) and 8(e).

Referring first to FIG. 8(a), in step S1, a decision is made as to whether a cart mounted with an automobile body has passed the entrance of a painting line. Then, in steps S2 and S3, data indicating a paint to be used and a car type is read, and then a paint parameter i and a car type parameter j are set. In step S5, a painting area number F(j) is set on the basis of the car type parameter j. In step S6, a paint density Dsp(i) is set on the basis of the paint parameter i. The process of steps S1 to S6 is the same as in the conventional process.

In step S7, a thinner density Dst for thinner for washing is set. The set thinner density Dst is used as a basic value in comparison with a thinner mass flow rate measured by the thinner mass flow meter 4Y. In step S8, a paint discharge rate Qv(i, j) is set on the basis of the paint parameter i and the car type parameter j. In steps S9 and S10, conversion constants Ksx(i, j) and Ksy(i, j), namely the electropneumatic conversion constants Kx and Ky, respectively, for the electropneumatic transducers 10X and 10Y are determined on the basis of the paint parameter i and the car type parameter j. In steps S11 and S12, the respective mass flow rates Qmx and Zmy of the paint and the thinner are calculated. In steps S13 and S14, signals based on the conversion constants Kx and Ky are issued respectively to the electropneumatic transducers 10X and 10Y. In step S15, a painting area frequency parameter k is initialized. In step S16, a decision is made as to whether a painting area frequency is satisfied. When the decision in step S16 is YES, a signal based on conversion constant Kx=255 is issued to the electropneumatic transducer 10X to fully open the pneumatic flow regulator 9X. Step S18 is executed to decide whether an unloaded cart has left the painting line, when the unloaded cart is detected in step S3. Step S18 is repeated until the unloaded cart leaves the painting line.

Figure 8C:
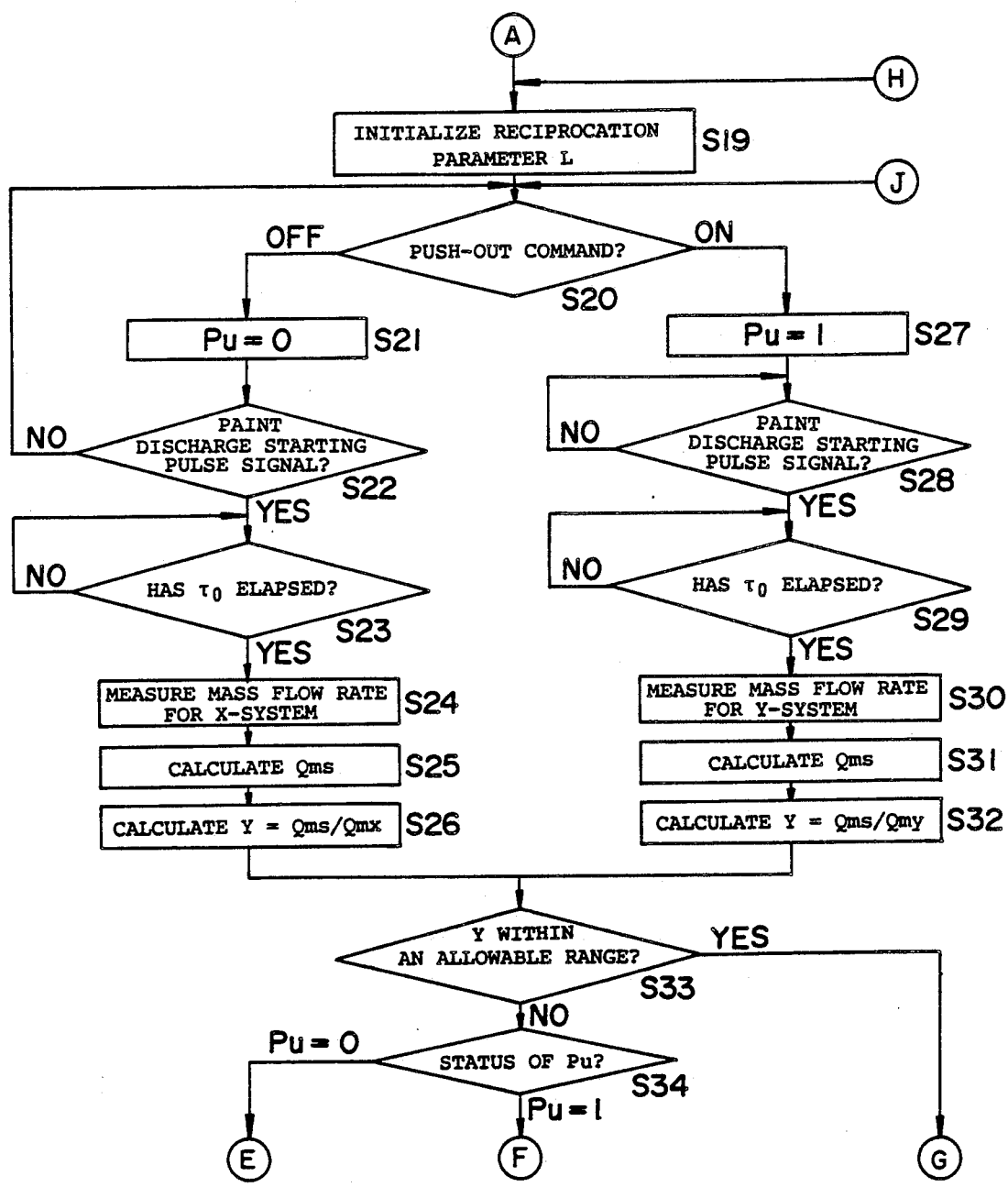
FIGS. 8(a), 8(b), 8(c), 8(d) and 8(e) are flow charts of a control program to be executed by a microcomputer incorporated into the paint discharge rate control system of FIG. 7.
Figure 8:
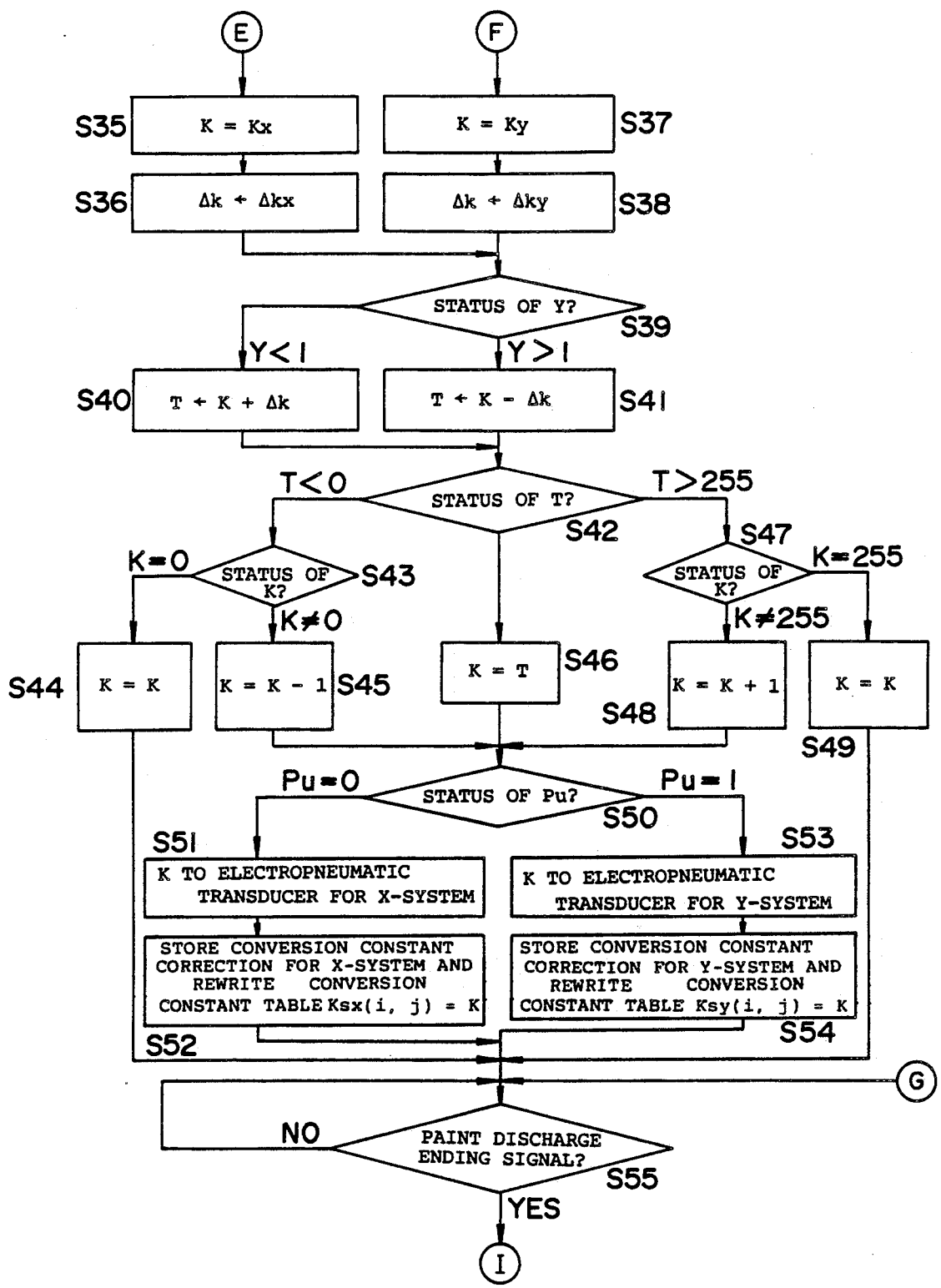

When the decision in step S16 is NO, a reciprocation parameter L for the painting machine is initialized in step S19 (FIG. 8(c)). In step S20, a decision is made as to whether a microcomputer 2 has received a push-out operation starting pulse signal from the data processing unit 1 of the painting machine. When the decision in step S20 is NO, a flag Pu=0 is set in step S21 and, when YES, a flag Pu=1 is set in step S27. In steps S22 and S28, a decision is made as to whether the microcomputer 2 has received a paint discharge starting pulse signal from the data processing unit 1 of the painting machine. When the decision in steps S22 and S28 is YES, steps S24, S25, S26 and S33 are executed a time $\tau_0$ after the reception of the paint discharge starting pulse signal by the microcomputer 2 to determine the deviation of the paint mass flow rate. In steps S30, S31, S32 and S33, a query is made as to whether the deviation of the thinner mass flow rate is within an allowable range.

In this embodiment, the paint discharge starting pulse signal is provided in synchronism with the reciprocation of a painting nozzle 3. Steps S24, S25 and S26 or steps S30, S31 and S32 are executed for sampling every time the paint discharge starting pulse signal is provided. Steps S23 and S29 are executed to hold the sampling operation until the outputs of the mass flow meters 4X and 4Y converge and stabilize.

If the deviation of the mass flow rate of the paint or the thinner is outside the allowable range, a decision is made in step S34 as to whether a push-out operation command is to be issued. When the decision in step S34 is NO, steps S35 and S36 are executed to change the conversion constant for the electropneumatic transducer 10X and to set a correction Δk for correcting the conversion constant and, when YES, steps S37 and S38 are executed to change the conversion constant for the electropneumatic transducer 10Y and to set a correction Δk for the conversion constant. In step S39, a decision is made as to whether the conversion constant for the electropneumatic transducer needs to be increased or decreased, and then step S40 or S41 is executed depending on the decision in step S39 to determine a new conversion constant T by increasing or decreasing the conversion constant. In step S42, the new conversion constant T is examined. When 0≦T≦255, the old conversion constant K is replaced by the new conversion constant T (K=T) in step S46. When T<0 or T>255, steps S43, S44 and S45, or steps S47, S48 and S49 are executed.

After the conversion constant for the electropneumatic transducer has been corrected, a decision is made again in step S50 as to whether a push-out operation command is to be issued. When the decision in step S50 is NO, a signal based on the new conversion constant K is issued to the electropneumatic transducer 10X in step S51 and the new conversion constant K is stored in the microcomputer 2 in step S52. When the decision in step S50 is YES, a signal based on the new conversion constant K is issued to the electropneumatic transducer 10Y in step S53 and the new conversion constant K is stored in the microcomputer 2 in step S54.

In step S55, a decision is made as to whether the microcomputer 2 has received a paint discharge ending pulse signal from the data processing unit 1, namely, as to whether the painting nozzle 3 has completed the one stroke. When the decision in step S55 is YES, a decision is made in step S56 as to whether the painting nozzle 3 has completed the return stroke. When the decision in step S56 is NO, the reciprocation parameter L is incremented in step S57, and then the control program returns to step S20. When the decision step S56 is YES, a decision is made in step S58 as to whether the painting operation is to be continued. When the decision in step S58 is YES, the control program returns to step S19 and, when NO, the painting area frequency parameter k is incremented in step S59, and then the control program returns to step S16.

Although the present invention has been described in its preferred embodiments, the present invention is not limited thereto and various modifications thereof are possible. For example, the control programs to be executed by the microcomputer 2 may be replaced with equivalent control programs. Furthermore, although the present invention has been described as applied to a painting machine for painting automobile bodies, the present invention is applicable to various painting machines which use a plurality of different paints selectively.

What is claimed is:

1. A paint discharge rate control system for controlling the rate at which paints are discharged from a paint nozzle, said system comprising:

a color changing valve group having valves, connected to a paint supply line between a paint supply means for accommodating paints and a paint discharge nozzle, for facilitating a supply of paints through the supply line toward the paint discharge nozzle;

a washing liquid valve, connected to the paint supply line between washing liquid supply means for accommodating washing liquid and the paint discharge nozzle, for facilitating a supply of washing liquid through the paint supply line toward the paint discharge nozzle;

a paint flow regulator, provided in the paint supply line between said color changing valve group and the paint discharge nozzle, for regulating the flow of paint through the paint supply line to the paint discharge nozzle;

flow meter means, provided in the paint supply line between said paint flow regulator and the paint discharge nozzle, for measuring the mass flow rate of fluid flowing in the paint supply line to the paint discharge nozzle and for issuing mass flow rate signals indicative of the mass flow rate measured; and control means operatively connected to said flow meter means for receiving the signals issued thereby and for calculating the volumetric flow rate of the fluid on the basis of said mass flow rate signals, and said control means operatively connected to said paint flow regulator for controlling said paint flow regulator on the basis of said mass flow rate during a main step of painting a workpiece, and for controlling said paint flow regulator subsequent to the main step of painting on the basis of said volumetric flow rate during a push-out operation, in which the valves of said color changing valve group are closed and the washing liquid valve is opened, to regulate the rate at which paint remaining in the paint supply line is pushed out of the paint discharge nozzle by the washing fluid to that at which the paint is discharged from the paint discharge nozzle during the main step of painting.

2. A paint discharge rate control system as claimed in claim 1, and further comprising timer means operatively associated with said control means for indicating the lapse of a predetermined time after the opening of said washing liquid valve, which time is sufficient in the system to allow washing liquid to flow to said flow meter means, wherein said control means controls said flow regulator on the basis of said volumetric flow rate upon the lapse of said predetermined time as indicated by said timer means.

3. A paint discharge rate control system as claimed in claim 1, wherein said flow meter means includes density measuring means for measuring the density of fluid flowing in the paint supply line to the paint discharge nozzle and for issuing density signals indicative of the density measured, and said control means calculates the volumetric flow rate of the fluid on the basis of said mass flow rate signals and said density signals.

4. A paint discharge rate control system as claimed in claim 3, wherein said flow meter means includes a Coriolis-type mass flow meter having a U-shaped tube connected in line with the paint supply line so as to vibrate when fluid passes therethrough, and an electronic unit means operatively connected to said U-shaped tube for detecting the vibrations thereof to in turn detect the mass flow rate of fluid flowing through the U-shaped tube.

5. A paint discharge rate control system as claimed in claim 4, wherein said electronic unit means also detects the density of fluid flowing through the U-shaped tube.

6. A paint discharge rate control system for controlling the rate at which paints are discharged from a paint nozzle, said system comprising:
   a color changing valve group having valves, connected to a paint supply line between a paint supply means for accommodating paints and a paint discharge nozzle, for facilitating a supply of paints through the supply line toward the paint discharge nozzle;
   a washing liquid valve, connected to the paint supply line between washing liquid supply means for accommodating washing liquid and the paint discharge nozzle, for facilitating a supply of washing liquid through the paint supply line toward the paint discharge nozzle;
   a paint flow regulator, provided in the paint supply line between said color changing valve group and the paint discharge nozzle, for regulating the flow of paint through the paint supply line to the paint discharge nozzle;
   first flow meter means, provided in the paint supply line between said paint flow regulator and the paint discharge nozzle, for measuring the mass flow rate of fluid flowing in the paint supply line to the paint discharge nozzle and for issuing mass flow rate signals indicative of the mass flow rate measured;
   a washing liquid flow regulator, provided in a washing liquid supply line connected to said washing liquid valve and the washing liquid supply means, for regulating the flow of washing liquid passing through the washing fluid valve toward the paint discharge nozzle;
   second flow meter means, provided in the washing liquid supply line, for measuring the mass flow rate of fluid flowing through the washing liquid supply line and for issuing mass flow rate signals indicative of the mass flow rate measured thereby; and a
   control means operatively connected to said first flow meter means and to said paint flow regulator for receiving the mass flow rate signals issued by said first flow meter means and for controlling said paint flow regulator on the basis of the mass flow rate signals issued by said first flow meter means during a main step of painting a workpiece, and
   said control means operatively connected to said second flow meter means and to said washing liquid flow regulator for receiving the mass flow rate signals issued by said second flow meter means, for comparing the mass flow rate signals issued by said second flow meter means with a predetermined washing liquid flow rate and for controlling said washing liquid flow regulator subsequent to the main step of painting on the basis of the comparison during a push-out operation, in which the valves of said color changing group are closed and the washing liquid valve is opened, to regulate the rate at which washing liquid flows through the washing liquid supply line to a predetermined washing liquid flow rate which causes washing liquid to push out paint remaining it the paint supply line at the rate at which the paint is discharged from the paint nozzle during the main step of painting.

7. A paint discharge rate control system as claimed in claim 6, wherein said washing liquid flow regulator is disposed upstream of said second flow meter means with respect to the direction of flow of washing liquid in the system.

8. A paint discharge rate control system for controlling the rate at which paints are discharged from a paint nozzle, said system comprising:
   a color changing valve group having valves, connected to a paint supply line between a paint supply means for accommodating paints and a paint discharge nozzle, for facilitating a supply of paints through the supply line toward the paint discharge nozzle;
   a washing liquid valve, connected to the paint supply line between washing liquid supply means for accommodating washing liquid and the paint discharge nozzle, for facilitating a supply of washing liquid through the paint supply line toward the paint discharge nozzle;
   a paint flow regulator, provided in the paint supply line between said color changing valve group and the paint discharge nozzle, for regulating the flow of paint through the paint supply line to the paint discharge nozzle;
   flow meter means, provided in the paint supply line between said paint flow regulator and the paint discharge nozzle, for measuring the mass flow rate of fluid flowing in the paint supply line to the paint discharge nozzle and for issuing mass flow rate signals indicative of the mass flow rate measured;
   a washing liquid flow regulator, provided in a washing liquid supply line connected to said washing liquid valve and the washing liquid supply means, for regulating the flow of washing liquid passing through the washing fluid valve toward the paint discharge nozzle; and control means operatively connected to said flow meter means for receiving the signals issued thereby and for calculating a volumetric flow rate on the basis of the mass flow rate signals issued by said flow meter means, said control means operatively connected to said paint flow regulator for controlling said paint flow regulator on the basis of said mass flow rate signals during a main step of painting a workpiece, and said control means operatively connected to said washing liquid flow regulator for controlling said washing liquid flow regulator subsequent to the main step of painting on the basis of said volumetric flow rate during a push-out operation, in which the valves of said color changing valve group are closed and the washing liquid valve is opened, to regulate the rate at which paint remaining in the paint supply line is pushed out of the paint discharge nozzle with the washing fluid to that at which the paint is discharged from the paint discharge nozzle during the main step of painting.

9. A paint discharge rate control system as claimed in claim 8, and further comprising timer means operatively associated with said control means for indicating the lapse of a predetermined time after the opening of said washing liquid valve, which time is sufficient in the system to allow washing liquid to flow to said flow meter means, wherein said control means controls said washing liquid flow regulator on the basis of said volumetric flow rate upon the lapse of said predetermined time as indicated by said timer means.

10. A paint discharge rate control system as claimed in claim 8, wherein said flow meter means includes density measuring means for measuring the density of fluid flowing in the paint supply line to the paint discharge nozzle and for issuing density signals indicative of the density measured therein, and said control means calculates the volumetric flow rate on the basis of said mass flow rate signals and said density signals.

11. A paint discharge rate control system as claimed in claim 10, wherein said flow meter means includes a Coriolis-type mass flow meter having a U-shaped tube connected in line with the paint supply line so as to vibrate when fluid passes therethrough, and an electronic unit means operatively connected to said U-shaped tube for detecting the vibrations thereof to in turn detect the mass flow rate of fluid flow through the U-shaped tube.

* * * * *